United States Patent [19]

Kusaka et al.

[11] Patent Number: 5,574,536
[45] Date of Patent: Nov. 12, 1996

[54] AUTOMATIC FOCUS ADJUSTMENT CAMERA

[75] Inventors: Yosuke Kusaka; Ken Utagawa, both of Kanagawa-ken, Japan

[73] Assignee: Nikon Corporation, Tokyo, Japan

[21] Appl. No.: 252,779

[22] Filed: Jun. 2, 1994

[30] Foreign Application Priority Data

Jun. 11, 1993 [JP] Japan .................................. 5-140975

[51] Int. Cl.⁶ .................................................. G03B 13/36
[52] U.S. Cl. ............................. 396/96; 396/114; 396/121; 396/125
[58] Field of Search ................................... 354/400, 402, 354/404, 406, 407, 408

[56] References Cited

U.S. PATENT DOCUMENTS

| | | | |
|---|---|---|---|
| 4,835,615 | 5/1989 | Taniguchi et al. | |
| 5,130,735 | 7/1992 | Kusaka et al. | 354/402 |
| 5,151,732 | 9/1992 | Akashi et al. | |
| 5,315,339 | 5/1994 | Hamada et al. | 354/400 |
| 5,333,028 | 7/1994 | Akashi et al. | 354/402 |
| 5,393,969 | 2/1995 | Ohsawa | 354/407 |

Primary Examiner—Michael L. Gellner
Assistant Examiner—D. P. Malley
Attorney, Agent, or Firm—Oliff & Berridge

[57] ABSTRACT

To improve the responsiveness of an automatic focus adjustment camera in which focus adjustment of the photographic lens is performed based on the results of focus detection in multiple regions, defocus amounts of the photographic optical system in multiple focus detection regions are detected asynchronously and independently of one another in multiple focus detection regions that are established on the photographic screen of the photographic optical system. The value of the defocus amounts in the various focus detection regions are compensated at times T3, T5, T8 and T9 when the defocus amounts are detected in the various focus detection regions, or at preset time intervals W, and the final defocus amount is set from among these multiple compensated defocus amounts in order to drive the photographic optical system.

46 Claims, 15 Drawing Sheets

AUTOMATIC FOCUS ADJUSTMENT CAMERA

BACKGROUND OF THE INVENTION

1. Field of the Invention

The present invention relates to an automatic focus adjustment camera that performs focus adjustment of the photographic optical system according to focus detection results in multiple focus detection regions on a photographic screen.

2. Description of Related Art

An automatic focus adjustment camera has been known that performs focus adjustment in multiple focus detection regions established on a photographic screen of a photographic optical system, detects the defocus amount of the photographic optical system in each of the focus detection regions, sets a final defocus amount from among these multiple defocus amounts, and drives the photographic optical system in accordance with this final defocus amount.

However, in conventional automatic focus adjustment cameras, each time focus detection is performed, the focus detection sensors are operated in all focus detection regions simultaneously, the focus detection computation is performed with respect to the output obtained from all of the sensors, and the final defocus amount is set after the defocus amounts from all of the focus detection regions are computed. As a result, when the length of time it takes for some of the focus detection regions to compute the defocus amount is large, the length of time it takes-to compute the final defocus amount becomes prolonged because of the length of time needed in these focus detection regions, causing the responsiveness of the focus adjustment to diminish.

For instance, when electric charge accumulation type sensors are used as the focus detection sensors, the electric charge accumulation time of the sensors that capture dim subjects is relatively long, so that the time interval in which the final defocus amount is computed increases in response to the electric charge accumulation time of the sensors that capture dim subjects, even when other sensors capture bright subjects.

SUMMARY OF THE INVENTION

It is an object of the present invention to improve the responsiveness of an automatic focus adjustment camera that performs focus adjustment of the photographic lens based on the focus detection results in multiple regions.

This and other objects of the invention are achieved by providing an automatic focus adjustment camera equipped with a photographic optical system that can move along the direction of the optical axis in order to form an image of the subject on the intended focus surface, multiple focus detectors that are provided in order to respond to multiple focus detection regions established on the photographic screen of the photographic optical system and that detect the amount of defocus of the photographic optical system in each focus detection region, a setting device that sets the final defocus amount from the multiple defocus amounts detected by the multiple focus detectors, and a drive device that focuses the photographic optical system by driving it in accordance with the final defocus amount set by the setting device. The multiple focus detectors operate asynchronously and independently of one another.

According to another aspect of the invention, each of the focus detectors possesses a focus detection optical system that forms an image of the subject with light from each focus detection region, a sensor that receives light from the image of the subject formed by the focus detection optical system, and computation circuits that compute the amount of defocus of the photographic optical system in each focus detection region based on the output of the sensors.

The sensors may be the electric charge accumulation type, and each of the focus detectors may possess an accumulation controller that controls the electric charge accumulation start time and the accumulation interval of each electric charge accumulation type sensor asynchronously and independently from the electric charge accumulation start time and the accumulation interval of the other electric charge accumulation type sensor.

The setting device may possess a memory that memorizes the multiple defocus amounts detected by the multiple focus detectors, and when the various focus detectors detect the defocus amounts, the camera compensates the defocus amounts stored in the memory in accordance with the amount of movement of the photographic optical system to that point, and also sets the final defocus amount from among the defocus amounts detected at that time and the compensated defocus amounts.

The setting device may possess a memory that memorizes the multiple defocus amounts detected by the multiple focus detectors, and at preset times compensates each defocus amount stored in the memory in accordance with the amount of movement of the photographic optical system to that point, and also sets the final defocus amount from among the compensated defocus amounts.

In accordance with another aspect of the invention, an automatic focus adjustment camera is equipped with a photographic optical system that can move along the direction of the optical axis in order to form an image of the subject on the intended focus surface, multiple focus detection optical systems that are provided in order to respond to multiple focus detection regions established on the photographic screen of the photographic optical system and that form an image of the subject with light from each focus detection region, multiple electric charge accumulation type sensors that receive light from the multiple images of the subject formed by the multiple focus detection optical systems, accumulation controllers that control the electric charge accumulation start times and the accumulation interval of the electric charge accumulation type sensors, a computation device that computes the defocus amount of the photographic optical system in each focus detection region based on the output of the multiple electric charge accumulation type sensors, a setting device that sets the final defocus amount from among the multiple defocus amounts computed by the computation device, and a drive device that focuses the photographic optical system by driving it in accordance with the final defocus amount set by the setting device. The accumulation controllers control the multiple electric charge accumulation sensors asynchronously and independently from one another.

The automatic focus adjustment camera may further include temporary retention devices that temporarily retain the output of the multiple electric charge accumulation type sensors, and an input controller that controls the temporary retention devices so that the outputs of the multiple electric charge accumulation type sensors are not simultaneously input into the computation device.

The setting device may possess a memory that memorizes the defocus amounts in each focus detection region computed by the computation device, and when the computation device computes the various defocus amounts, the camera can compensate each defocus amount stored in the memory in accordance with the amount of movement of the photographic optical system to that point, and also can set the final defocus amount from among the defocus amounts detected at that time and the compensated defocus amounts.

The setting device may possess a memory that memorizes the defocus amounts in each focus detection region computed by the computation device, and at preset times may compensate each defocus amount stored in the memory in accordance with the amount of movement of the photographic optical system to that point, and also can set the final defocus amount from among the compensated defocus amounts.

The photographic optical system is driven after the defocus amounts of the photographic optical system in each focus detection region have been detected asynchronously and independently of one another in the multiple focus detection regions that are established on the photographic screen of the photographic optical system, the defocus amounts in each focus detection region have been compensated to the value at the time when the defocus amounts in the various detection regions are detected or at preset time intervals, and the final defocus amount has been set from among the multiple defocus amounts that have been compensated. Through this, it is possible to set the final defocus amount in a short time even if there are focus detection regions that require long time periods to detect the defocus amount, thereby making it possible to improve the responsiveness of the focus adjustment.

The following paragraphs that describe the means and functions used to solve the problems discussed above and to explain the structure of the present invention use drawings of the embodiments in order to explain the present invention in easy to understand terms, but the present invention is in no way limited to the embodiments herein.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

First Embodiment

Figure 1:
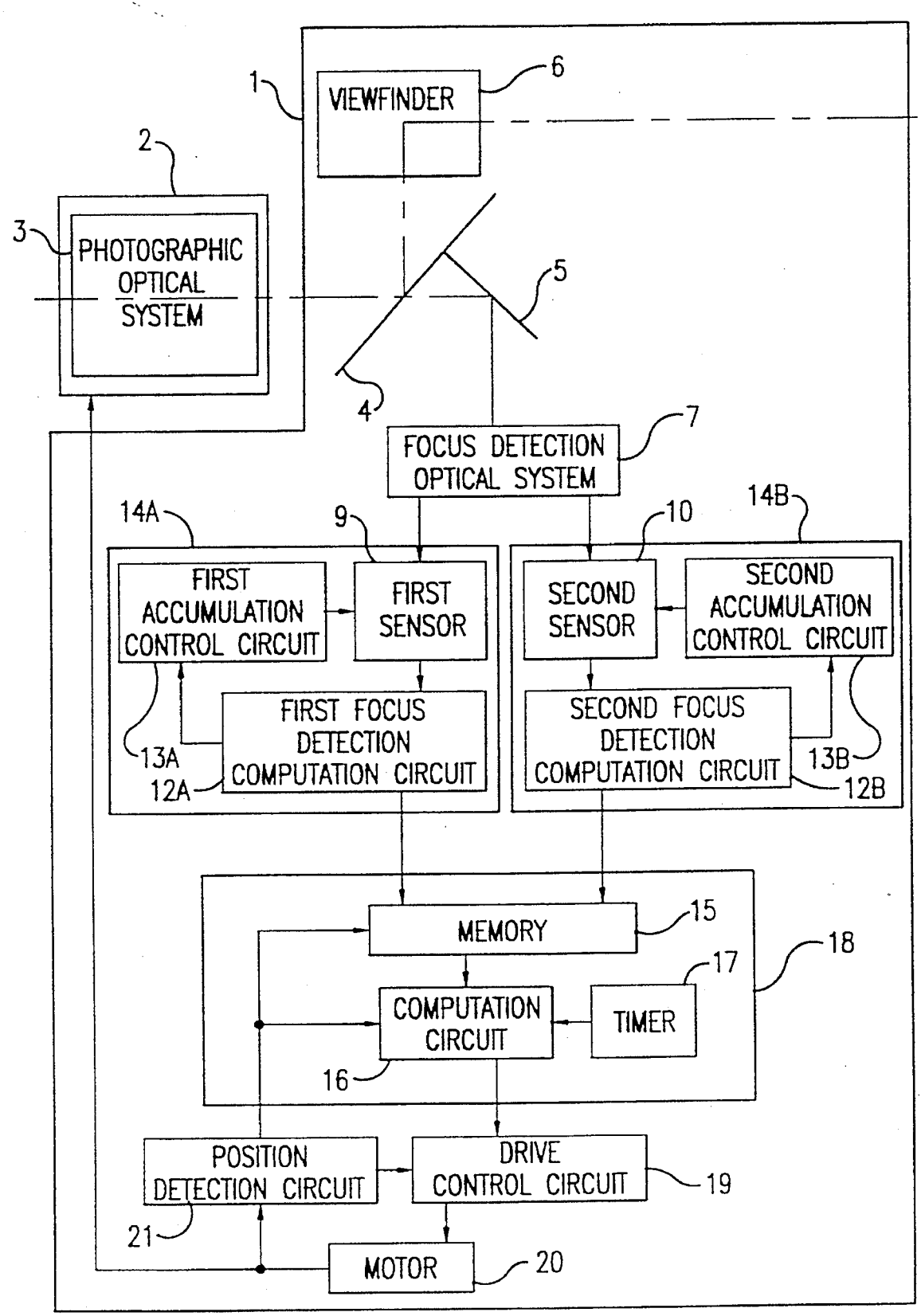
FIG. 1 is a block drawing showing the structure of the first embodiment.

FIG. 1 is a drawing showing the structure of the first embodiment.

The lens 2 is structured so as to be removable from the body 1, and FIG. 1 shows the state in which the lens 2 is mounted on the body 1. Inside the lens 2 is a photographic optical system 3, and light rays from the subject passing through the photographic optical system 3 are separated by the main mirror 4, which is a half mirror, into rays that go in the direction of an auxiliary mirror 5 and in the direction of the viewfinder 6. The light rays that are deflected further toward the bottom of the body by the auxiliary mirror 5 are guided to a focus detection optical system 7, which is provided near the intended focussing surface of the photographic optical system 3.

Figure 2:
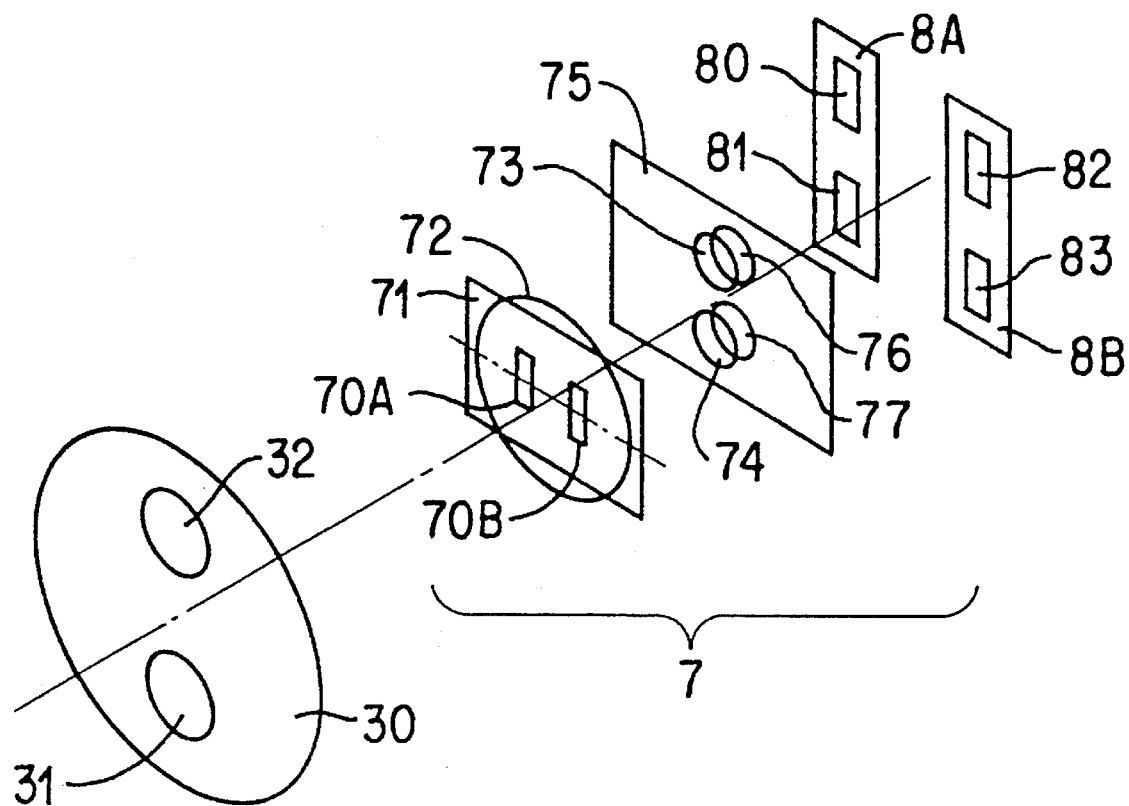
FIG. 2 is an angled view showing the structure of the focus detection optical system and the electric charge accumulation type sensors.

FIG. 2 shows the structure of the focus detection optical system 7 and the electric charge accumulation type sensors 8A and 8B.

The focus detection optical system 7 is equipped with a field of vision mask 71 containing apertures 70A and 70B, a condenser lens 72, a diaphragm mask containing a pair of diaphragm apertures 73 and 74, and a pair of re-imaging lenses 76 and 77. In addition, the two electric charge accumulation type sensors 8A and 8B are each equipped with a pair of light receptors 80 and 81, and 82 and 83, respectively. The primary image formed at the aperture 70A along the optical axis by the photographic optical system 3 is recreated as a pair of secondary images on the light receptors 80 and 81, and the primary image formed at the aperture 70B is recreated as a pair of secondary images on the light receptors 82 and 83.

Figure 3:
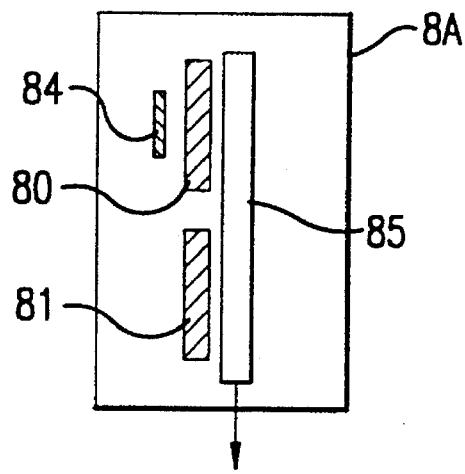
FIG. 3 is a drawing showing the detailed structure of the electric charge accumulation type sensors.

FIG. 3 shows the detailed structure of the electric charge accumulation type sensor 8A.

In this figure, the light receptors 80 and 81 are composed of numerous pixels, and a light quantity monitor 84 is mounted near the light receptor 80. In addition, a shift register 85 used in charge output transfer is mounted parallel to the light receptors 80 and 81.

The electric charge accumulation type sensor 8A begins to accumulate photoelectrically converted electric charge in the light receptors 80 and 81 when it receives an electric charge accumulation start signal from the outside. Simultaneous with this, the light quantity monitor 84 generates a monitor voltage in accordance with the illumination of the light receptor 80 and the electric charge accumulation time. This monitor voltage is output and is compared with a preset standard voltage by the first accumulation control circuit 13A, which will be described below. When the monitor voltage reaches the standard voltage, the first accumulation control circuit 13A generates an electric charge accumulation completion signal for the electric charge accumulation type sensor 8A. The electric charge accumulation type sensor 8A, upon receiving the electric charge accumulation completion signal from the outside, transfers the accumulated photoelectrically converted electric charge in the receptors 80 and 81 to the shift register 85, following which it serially transfers to the outside the electric charge accumulated in each pixel as the sensor output following a transfer clock.

The structure and operation of the electric charge accumulation type sensor 8B is identical to the structure and operation of the electric charge accumulation type sensor 8A, so explanation of such is omitted here.

In the structure described above, the pair of diaphragm apertures 73 and 74 are focussed by the condenser lens 72 onto a pair of regions 31 and 32 on the surface 30 of the exit pupil of the photographic optical system 3, and light that passes through these regions is formed first as a primary image in the vicinity of the field of vision mask 71. The primary image formed on the apertures 70A and 70B of the field of vision mask 71 passes through the condenser lens 72 and the pair of diaphragm apertures 73 and 74, and is formed as 2 pairs of secondary images by the pair of re-imaging lenses 76 and 77 on the light receptors 80 and 81 of electric charge accumulation type sensor 8A and on the light receptors 82 and 83 of the electric charge accumulation type sensor 8B.

With this type of structure, the relationship of the relative positions of one pair of secondary images changes in accordance with the focus condition of the photographic optical system 3. The light intensity distribution of the secondary image is converted from light to electricity by the light receptors 80, 81, 82 and 83, and becomes a subject image signal.

The electric charge accumulation type sensor 8A shown in FIGS. 2 and 3 makes up the first sensor 9 shown in FIG. 1, and the electric charge accumulation type sensor 8B makes up the second sensor 10.

Figure 4:
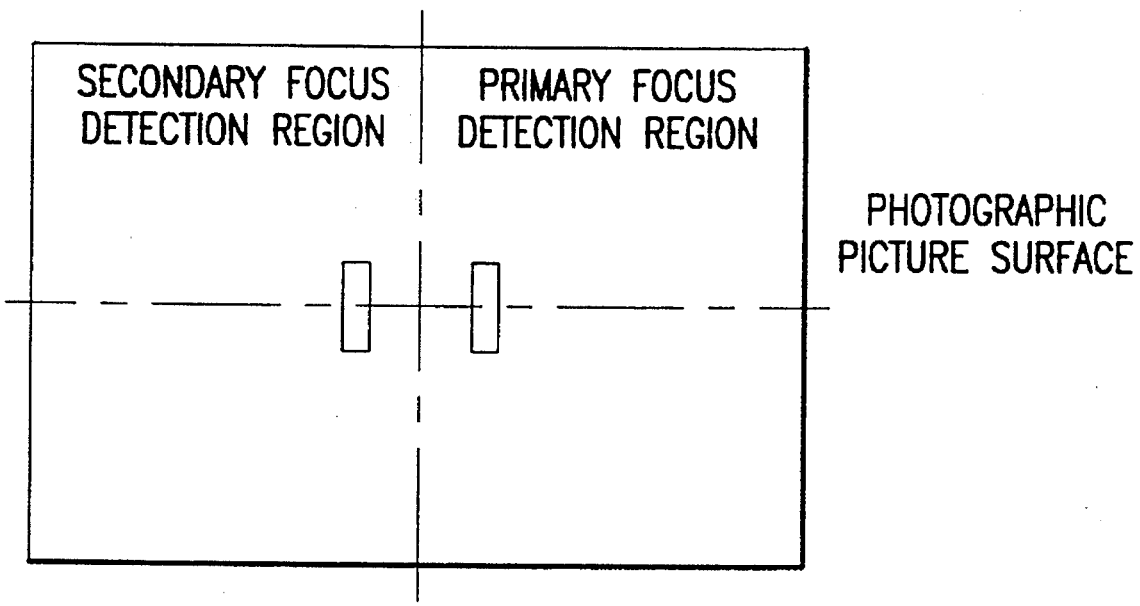
FIG. 4 is a drawing showing the positioning of the focus detection regions on the photographic screen.

In addition, through the focus detection optical system described above, the first focus detection region and the second focus detection region are established on the photographic screen, as shown in FIG. 4.

Referring again to FIG. 1, the pair of subject image signals from the first sensor 9 and the pair of subject image signals from the second sensor 10 are sent to the first focus detection computation circuit 12A and the second focus detection computation circuit 12B, respectively. By computing the relationship between the relative positions of these subject image signals, the first focus detection computation circuit 12A and the second focus detection computation circuit 12B detect the defocus amount X of the intended focus surface and the image surface in the first focus detection region of the photographic optical system 3, and the defocus amount Y of the intended focus surface and the image surface in the second focus detection region.

However, because the photographic optical system 3 is driven and the image surface also moves to this same extent even during electric charge accumulation in the first sensor 9 and the second sensor 10 and during the defocus amount computation, the amount of driving of the photographic optical system during the time between the middle of charge accumulation and completion of the computation is converted into a defocus amount, and defocus amounts compensated by subtracting from the defocus amounts computed at the completion of the computation the defocus amounts converted due to driving of the lens are taken as the defocus amounts X and Y. In other words, the defocus amounts X and Y indicate the defocus amounts upon the completion of defocussing.

The first sensor 9, the first focus detection computation circuit 12A and the first accumulation control circuit 13A make up the first focus detection unit 14A, and the second sensor 10, the second focus detection computation circuit 12B and the second accumulation control circuit make up the second focus detection unit 14B. The first accumulation control circuit 13A controls electric charge accumulation in the first sensor 9, and the second accumulation control circuit 13B controls electric charge accumulation in the second sensor 10. These electric charge accumulation controls are performed asynchronously and independently of one another. The first focus detection unit 14A and the second focus detection unit 14B operate asynchronously and independently of one another and output the defocus amounts X and Y to the defocus amount setting part 18.

The defocus amount setting part 18 is composed of a memory 15, a computation circuit 16 and a timer 17, and it sets the final defocus amount Z from the defocus amounts X and Y computed by the first focus detection computation circuit 12A and the second focus detection computation circuit 12B, respectively. The memory 15 reads the lens position at the time when the defocus amounts X and Y are generated from a position detection circuit 21, which will be explained below, and stores these values in pairs with the defocus amounts X and Y.

The computation circuit either sets the final defocus amount Z based on the lens position and defocus amounts stored in the memory 15 and the currently detected lens position and defocus amounts, or sets the final defocus amounts based on lens position and defocus amounts stored in the memory 15 when the timer 17 sends an interruption signal at a set time interval. Detailed explanation of this method of setting the final defocus amount will be provided below.

The final defocus amount Z is sent to the drive control circuit 19 and is converted into a lens driving amount. The position detection circuit 21 computes the lens driving amount by detecting the rotations of the motor 20 and also computes the lens position by multiplying it with the amount of rotation, taking the direction of rotation into consideration. The drive control circuit 19 drives the motor 20 to move the photographic optical system 3 connected to the motor 20 and also monitors the lens driving amount with the position detection circuit 21 and stops the motor when the desired lens driving amount is reached.

Next, the action of the first embodiment explained above will be explained.

Figure 5:
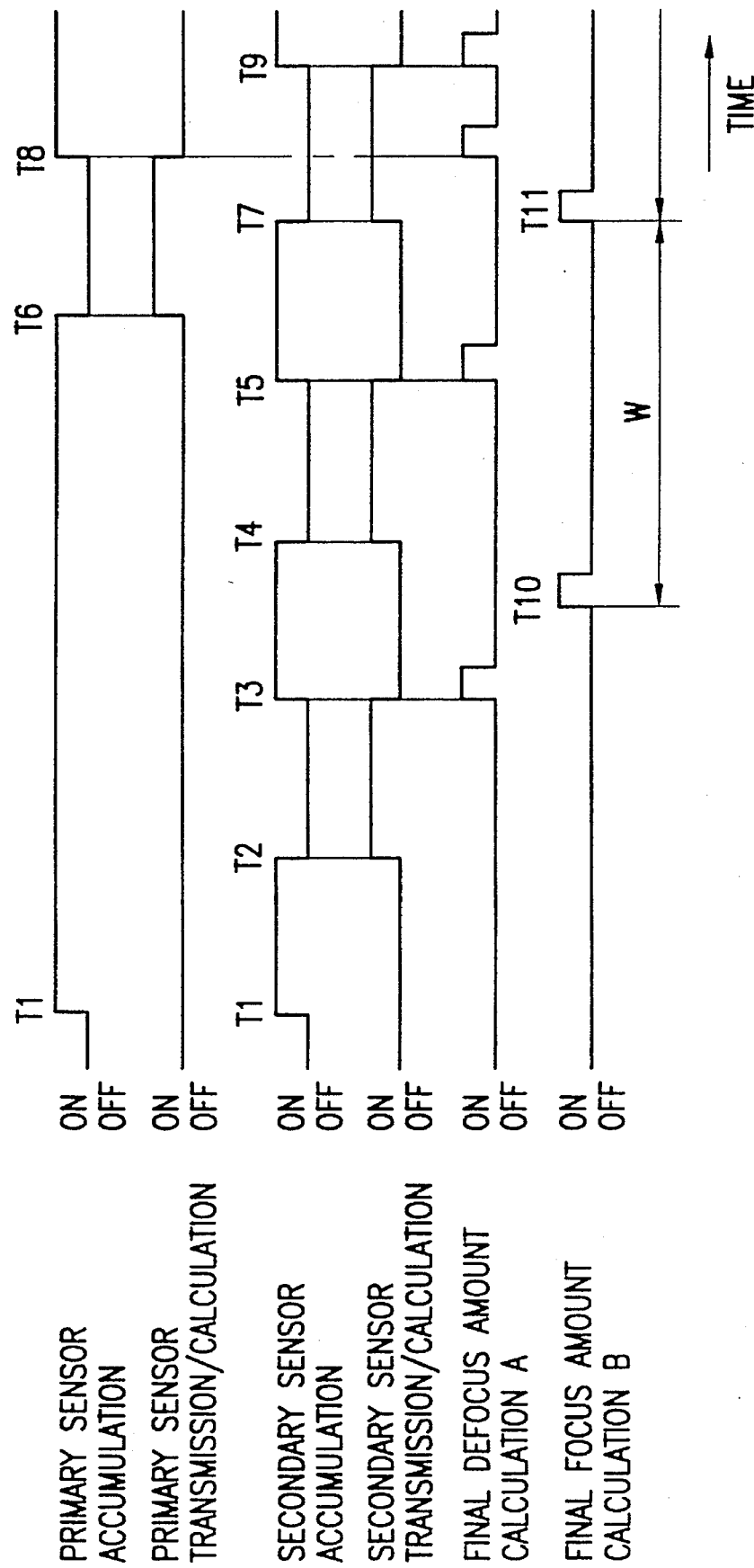
FIG. 5 is a time chart showing the operations of the first and second sensors in the first embodiment, and computation of the final defocus amount.

FIG. 5 is a time chart showing the focus detection computation and final defocus amount computation based on the electric charge accumulation, output transfer and output of the first sensor 9 and the second sensor 10. In order to make the explanation easier to understand, FIG. 5 shows the case where electric charge accumulation in both the first sensor 9 and the second sensor 10 start simultaneously at time T1, with the first sensor 9 and the second sensor 10 already in operation prior to this time T1 and the electric charge accumulation, output transmission, focus detection computation and the final defocus amount computations already being performed.

The first sensor 9 has a longer electric charge accumulation time than the second sensor 10 because the first sensor 9 captures dim subjects. The first sensor 9 completes its electric charge accumulation at time T6, performs output transfer and focus detection computations by time T8, and generates defocus amount X. After this, from time T8 it repeats the operations described above. The second sensor 10 completes its electric charge accumulation at time T2, performs output transfer and focus detection computations by time T3, and generates defocus amount Y. After this, it repeats the operations described above, and successively creates the defocus amount Y at times T5 and T9.

The defocus amount setting part 18 memorizes the defocus amount Y and the current lens position at time T3 when the defocus amount Y is generated, and also sets the final defocus amount Z based on the defocus amount Y and the current lens position as well as on the most recent defocus amount X stored in the memory 15 and the lens position at the time when this defocus amount X was generated, as shown in the final defocus amount computation A in FIG. 5. In addition, it memorizes the defocus amount Y and the current lens position when the next defocus amount Y is generated at time T5 and sets the final defocus amount Z based on the defocus amount Y and the current lens position as well as on the most recent defocus amount X stored in the memory 15 and the lens position at the time when this defocus amount X was generated. Furthermore, it memorizes the defocus amount X and the current lens position when the defocus amount X is generated at time T8, and sets the final defocus amount Z based on the defocus amount X and the current lens position as well as on the defocus amount Y generated at time T5 and stored in the memory and the lens position at the time when this defocus amount Y was generated.

In this way, the first focus detection unit 14A and the second focus detection unit 14B operate asynchronously and independently of one another, and the final defocus amount Z is updated each time either the defocus amount X or the defocus amount Y is generated. In conventional automatic focus adjustment cameras, the detection time for the final defocus amount Z is limited to the detection time of the focus detection sensor having the longer detection time. With the example shown in FIG. 5, this would mean detecting the final defocus amount Z at time T8. In contrast to this, using the method of final defocus amount computation A in the first embodiment, it is possible to make the detection time of the final defocus amount Z coincide with the detection time of the focus detection sensor with the shorter detection time (here, second sensor 10), thereby improving the responsiveness of the focus adjustment.

It is also acceptable for the operation of detecting the final defocus amount Z to be that shown in the final defocus amount computation B in FIG. 5. In this case, the computation circuit 16 performs the final defocus amount Z computation after receiving an interruption signal from the timer 17 at a set time interval W. At time T10 shown in FIG. 5, the final defocus amount Z is set based on the current lens position, the defocus amount X stored in the memory 15 and the lens position at the time this defocus amount X was generated, and the defocus amount Y and the lens position at the time this defocus amount Y was generated. Following this, this final defocus amount Z computation is repeated after each time interval W.

In this manner, the time interval between generation of the final defocus amount Z can be fixed, and it is also possible to create updates of the lens driving target each time the final defocus amount Z is generated at certain fixed time intervals, thereby improving the stability of control. In addition, even when the detection times of the various focus detection sensors becomes shorter than is necessary, computation of the final defocus amount Z is performed at a set time interval having no relationship with the detection time of the focus detection sensors, and because of this, the computation circuit 16 can execute other processes besides just the computation of the final defocus amount Z.

Figure 6:
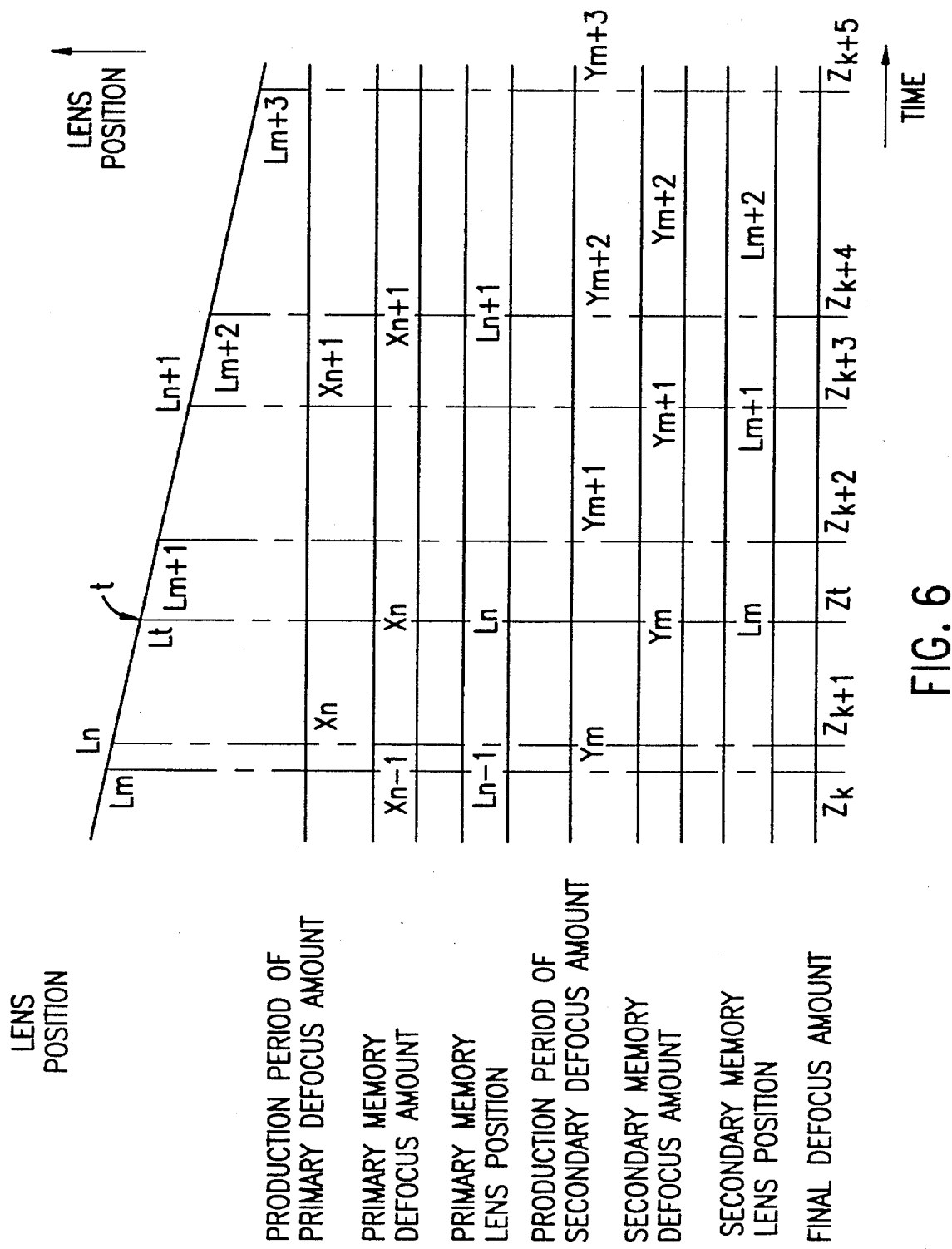
FIG. 6 is a time chart explaining the operation of the first embodiment.

FIG. 6 is a time chart showing change in lens position, generation periods for the defocus amounts X and Y, and the change with time of the contents stored in the memory 15. In this figure, the defocus amount X is called the first defocus amount, and the first defocus amount and the lens position at the time that this first defocus amount is generated, which are both stored in memory, are called the first memorized defocus amount and the first memorized lens position. In addition, the defocus amount Y is called the second defocus amount, and the second defocus amount and the lens position at the time that this second defocus amount is generated, which are both stored in memory, are called the second memorized defocus amount and the second memorized lens position.

First, when the defocus amount Ym is generated at lens position Lm, Ym is stored in the memory 15 as the second memorized defocus amount, and Lm is stored as the second memorized lens position. At this time, the computation circuit 16 creates the compensated defocus amount X'n-1 based on the first memorized defocus amount Xn-1, the first memorized lens position Ln-1, and the current lens position Lm, using the following equation.

$$X'n\text{-}1 = (Xn\text{-}1) + K \times \{(Ln\text{-}1) - Lm\} \quad (1)$$

Here, K is a coefficient used to convert the lens driving amount into a defocus amount.

Next, the computation circuit 16 computes the final defocus amount Zk by averaging the defocus amount Ym and the compensated defocus amount X'n-1, using the following equation.

$$Zk = \{(X'n\text{-}1) + Ym\}/2 \quad (2)$$

At this time, it would also be acceptable to set the final defocus amount Zk by selecting as the defocus amount the nearer of the compensated defocus amount X'n-1 and the defocus amount Ym, as shown in the following equation.

$$Zk = \text{MAX}\{(X'n\text{-}1), Ym\} \quad (3)$$

Here, a positive sign on the defocus amount indicates a nearer defocus amount.

When the defocus amount Xn is generated at lens position Ln, Xn is stored in the memory 15 as the first memorized defocus amount and Ln is stored as the first memorized lens position. At this time, the computation circuit 16 generates a compensated defocus amount Y'm based on the second memorized defocus amount Ym, the second memorized lens position Lm and the current lens position Ln, using the following equation.

$$Y'm = Ym + K \times (Lm - Ln) \quad (4)$$

Next, the computation circuit 16 computes a final defocus amount Z based on the defocus amount Xn and the compensated defocus amount Y'm using either equation 5 or equation 6 below.

$$Zk+1 = (Xn + Y'm)/2 \quad (5)$$

$$Zk+1 = MAX(Xn, Y'm) \quad (6)$$

The defocus amount setting part 18 repeats the computations described above each time the defocus amount X and the defocus amount Y are generated, following the method of the final defocus amount computation A shown in FIG. 5, thereby producing final defocus amounts Zk+2, Zk+3, Zk+4, Zk+5, etc.

On the other hand, with the method of the final defocus amount computation B shown in FIG. 5, the operations of generating the first defocus amount, the first memorized defocus amount, the first memorized lens position, the second defocus amount, the second memorized defocus amount, and the second memorized lens position, and operations up through the updating of the memory are the same as with the final defocus amount computation A. The computation to find the final defocus amount is not performed at the time that the first defocus amount or the second defocus amount is generated, but rather with a set periodic timing that is independent of generation of the first and second defocus amounts.

Taking time t in FIG. 6 as the timing of the final defocus amount computation in computation method B, when the lens position at that time is set as Lt, the compensated defocus amounts X'n and Y'm are computed based on the most recent first memorized defocus amount Xn, first memorized lens position Ln, second memorized defocus amount Ym, and second memorized lens position Lm prior to this time t, using the following equations.

$$X'n = Xn + K \times (Ln - Lt)$$

+TM (7)

$$Y'm = Ym + K \times (Lm - Lt)$$

+TM (8)

Next, the computation circuit 16 computes the final defocus amount Zt based on the compensated defocus amounts X'n and Y'm using either equation 9 or equation 10 below.

$$Zt = (X'n + Y'm)/2 \quad (b\ 9)$$

$$Zt = MAX(X'n, Y'm) \quad (10)$$

The above operations are repeated with a set periodic timing, thereby computing the final defocus amounts Zt+1, Zt+2, etc.

With the above final defocus amount computation methods A and B, the subject is taken to be stationary and only the amount of lens movement between the generation of the defocus amount and the computation of the compensated defocus amount is compensated; but, taking movement by the subject into consideration, it would also be viable to detect the rate of change Vx and Vy in the first defocus amount and the second defocus amount, respectively, caused by movement by the subject from the previous changes in the multiple defocus amounts, and to compute the final defocus amount using the following equations 11, 12, 13, and 14 in place of equations 1, 4, 7 and 8 respectively.

$$X'n-1 = (Xn-1) + K \times \{(Ln-1) - Lm\} + (Vxn-1) \times \{(tn-1) - tm\} \quad (11)$$

$$Y'm = Ym + K \times (Lm - Ln) + Vym \times (tm - tn) \quad (12)$$

$$X'n = Xn + K \times (Ln - Lt) + Vxn \times (tn - t) \quad (13)$$

$$Y'm = Ym + K \times (Lm - Lt) + Vym \times (tm - t) \quad (14)$$

Here, the times tn-1, tn and tm are times when the defocus amounts Xn-1, Xn and Ym were generated, and the defocus amount rates of change Vxn-1, Vxn and Vym indicate the rate of change in defocus amount at the time when the defocus amounts Xn-1, Xn and Ym were generated. For instance, the first defocus amount rate of change Vxn is found using the following equation.

$$Vxn = [\{Xn - (Xn-1)\} + K \times \{Ln - (Ln-1)\}]/\{tn - (tn-1)\} \quad (15)$$

Figure 7:
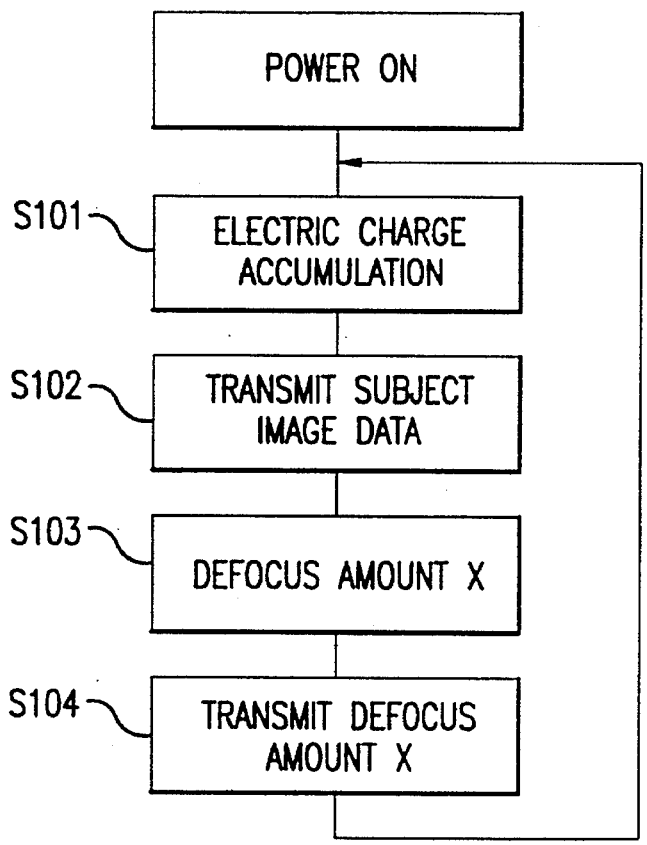
FIG. 7 is a flow chart showing the operations of the microcomputer in the first focus detection unit.
Figure 8:
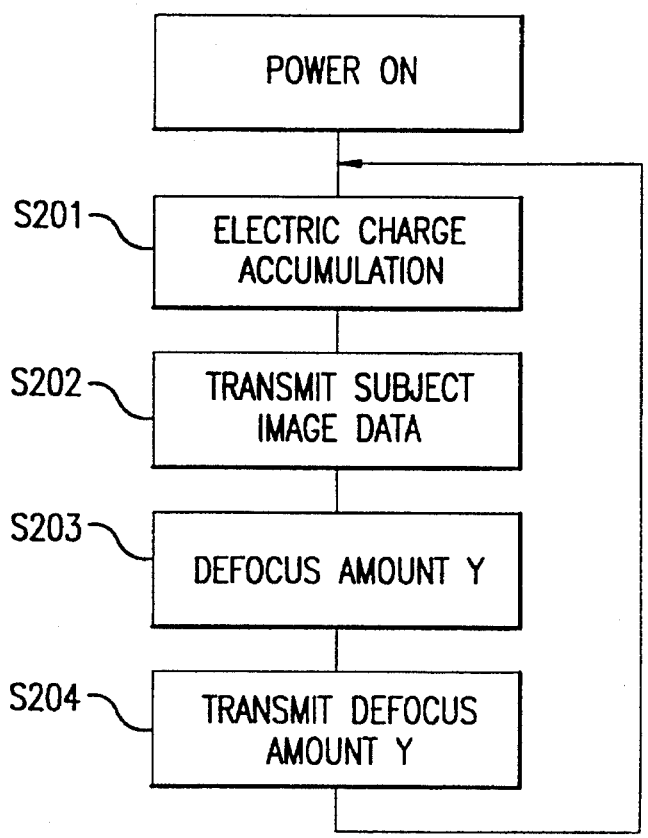
FIG. 8 is a flow chart showing the operations of the microcomputer in the second focus detection unit.
Figure 9:
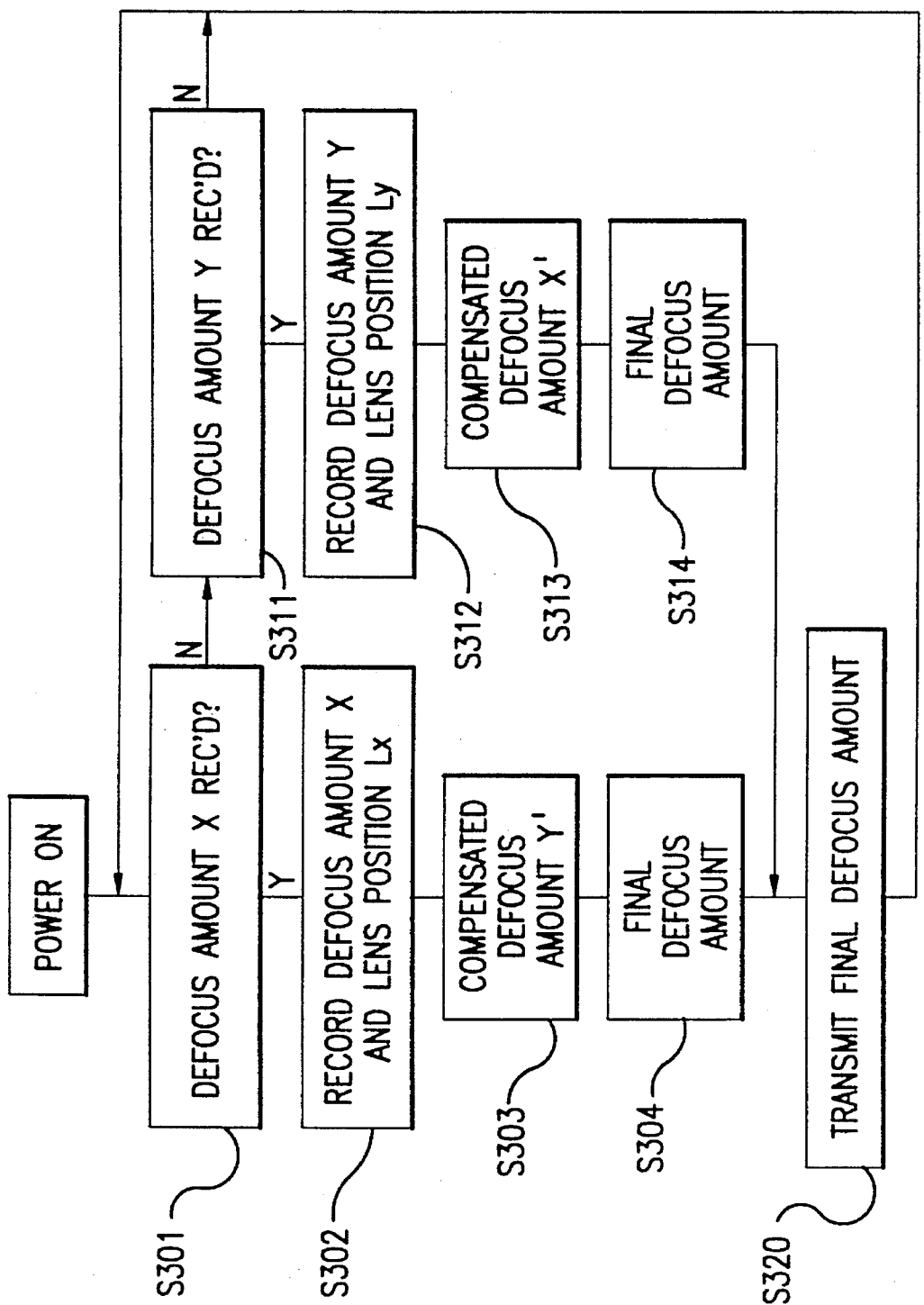
FIG. 9 is a flow chart showing the operations of the microcomputer in the defocus amount setting part.

FIGS. 7 through 9 are flow charts of the electric charge accumulation control and the focus detection computation in the cases where the first focus detection unit 14A and the second focus detection unit 14B have been equipped with microcomputers and when the defocus amount setting part 18 has been equipped with a microcomputer.

The microcomputer in the first focus detection unit 14A begins the operations shown in FIG. 7 when a power source is activated in the camera. In step S101, the electric charge accumulation operation of the first sensor 9 is performed, following which in step S102 the subject image data detected by the first sensor 9 is transmitted to the focus detection computation circuit 12A. In step S103, the subject image data is processed in order to compute the defocus amount X, and in step S104 the defocus amount X is output to the defocus amount setting part 18. Following this, the microcomputer returns to step S101 and repeats the above process.

The microcomputer in the second focus detection unit 14B begins the operations shown in FIG. 8 when a power source is activated in the camera. In step S201, the electric charge accumulation operation of the second sensor 10 is performed, following which in step S202 the subject image data detected by the first sensor 10 is transmitted to the focus detection computation circuit 12B. In step S203, the subject image data is processed in order to compute the defocus amount Y, and in step S204 the defocus amount Y is output to the defocus amount setting part 18. Following this, the microcomputer returns to step S201 and repeats the above process.

The microcomputer in the defocus amount setting part 18 begins the operations shown in FIG. 9 when a power source is activated in the camera. In step S301, the determination is made as to whether or not the defocus amount X has been received from the first focus detection unit 14A, and if the defocus amount X has been received, the microcomputer advances to step S302. In step S302, the lens position Lx at the time when the defocus amount X was received is read from the position detection circuit 21, and this is stored in the memory 15 along with the defocus amount X that has been received. In step S303, the compensated defocus amount Y' is computed as was described above based on the defocus amount Y and the lens position at the time that this defocus amount Y was generated, which are stored in the memory 15. In step S304, the final defocus amount Z is set using either equation 5 or equation 6 above based on the defocus amount X and the compensated defocus amount Y', following which the microcomputer advances to step S320 and sends the final defocus amount Z to the drive control circuit 19.

On the other hand, when the defocus amount X has not been received in step S301, the microcomputer moves to step S311 and determines whether or not the defocus amount Y has been received from the second focus detection unit 14B. If the defocus amount Y has been received, the microcomputer advances to step S312, and if it has not been received the microcomputer returns to step S301. In step S312, the lens position Ly at the time when the defocus amount Y was received is read from the position detection circuit 21, and this is stored in the memory 15 along with the defocus amount Y that has been received. In step S313, the compensated defocus amount X' is computed as was described above based on the defocus amount X and the lens position at the time that this defocus amount X was generated, which are stored in the memory 15. In step S314, the final defocus amount Z is set using either equation 5 or equation 6 above based on the defocus amount Y and the compensated defocus amount X', following which the microcomputer advances to step S320 and sends the final defocus amount Z to the drive control circuit 19.

Figure 10:
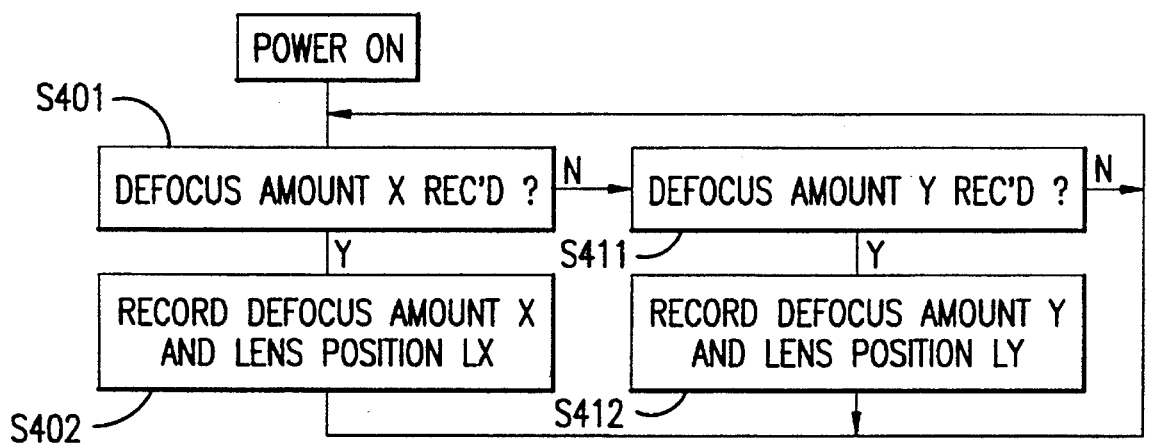
FIG. 10 is a flow chart showing the operations of the microcomputer in the defocus amount setting part for the case in which the final defocus amount computation method B shown in FIG. 5 is used.

FIG. 10 is a flow chart of the operations of the defocus amount setting part 18 when final defocus amount computation method B is used. From this flow chart, the operations of the first embodiment using this final defocus amount computation method B will be explained.

In step S401, the determination is made as to whether or not the defocus amount X has been received from the focus detection unit 14A, and if the defocus amount X has been received, the microcomputer advances to step S402. In step S402, the lens position Lx at the time when the defocus amount X was generated is read from the position detection circuit 21, the defocus amount X and this lens position Lx are stored in the memory 15, and the microcomputer returns to step S401.

On the other hand, when the defocus amount X has not been received in step S401, the microcomputer moves to step S411 and determines whether or not the defocus amount Y has been received. If the defocus amount Y has been received, the microcomputer advances to step S412, and if it has not been received, the microcomputer returns to step S401. In step S412, the lens position Ly at the time when the defocus amount Y was generated is read from the position detection circuit 21, the defocus amount Y and this lens position Ly are stored in the memory 15, and the microcomputer returns to step S401.

Figure 11:
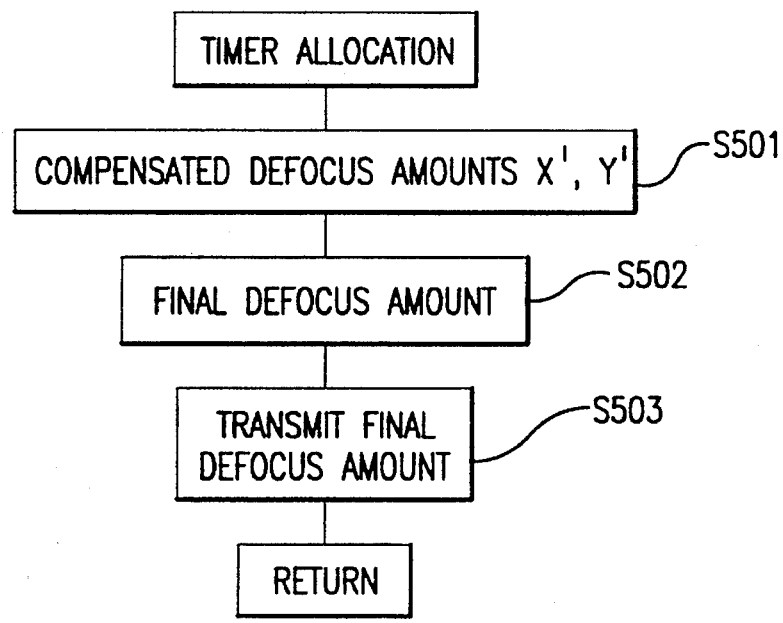
FIG. 11 is a flow chart showing the timer interruption operation of the microcomputer in the defocus amount setting part for the case in which the final defocus amount computation method B shown in FIG. 5 is used.

FIG. 11 is a flow chart showing the timer interruption operation of the defocus setting part 18.

The timer 17 performs the timer interruption operation shown in FIG. 11 on the microcomputer in the defocus amount setting part 18 with a set frequency. When the timer interruption operation is initiated, the compensated defocus amounts X' and Y' are found in step S501 using equations 7 and 8 above based on the defocus amounts X and Y and the lens positions Lx and Ly, which are all stored in the memory 15, and on the current lens position. Then, in step S502, the final defocus amount Z is set using either equation 9 or equation 10 above based on the compensated defocus amounts X' and Y'. In step S503, the final defocus amount Z is sent to the drive control circuit 19, and the interruption operation is completed.

Second Embodiment

With the first embodiment, which has been explained above, the first sensor 9 and the second sensor 10 send subject image signals to separate microcomputers, and the focus detection computation is performed by converting the signals from these sensors to digital signals using A/D converters mounted inside each of the microcomputers. This arrangement requires two microcomputers equipped with A/D converters. A second embodiment will now be described, wherein the first sensor 9 and the second sensor 10 send subject image signals to a single microcomputer, where the focus detection computation is performed by converting these signals into digital signals using an A/D converter.

Figure 12:
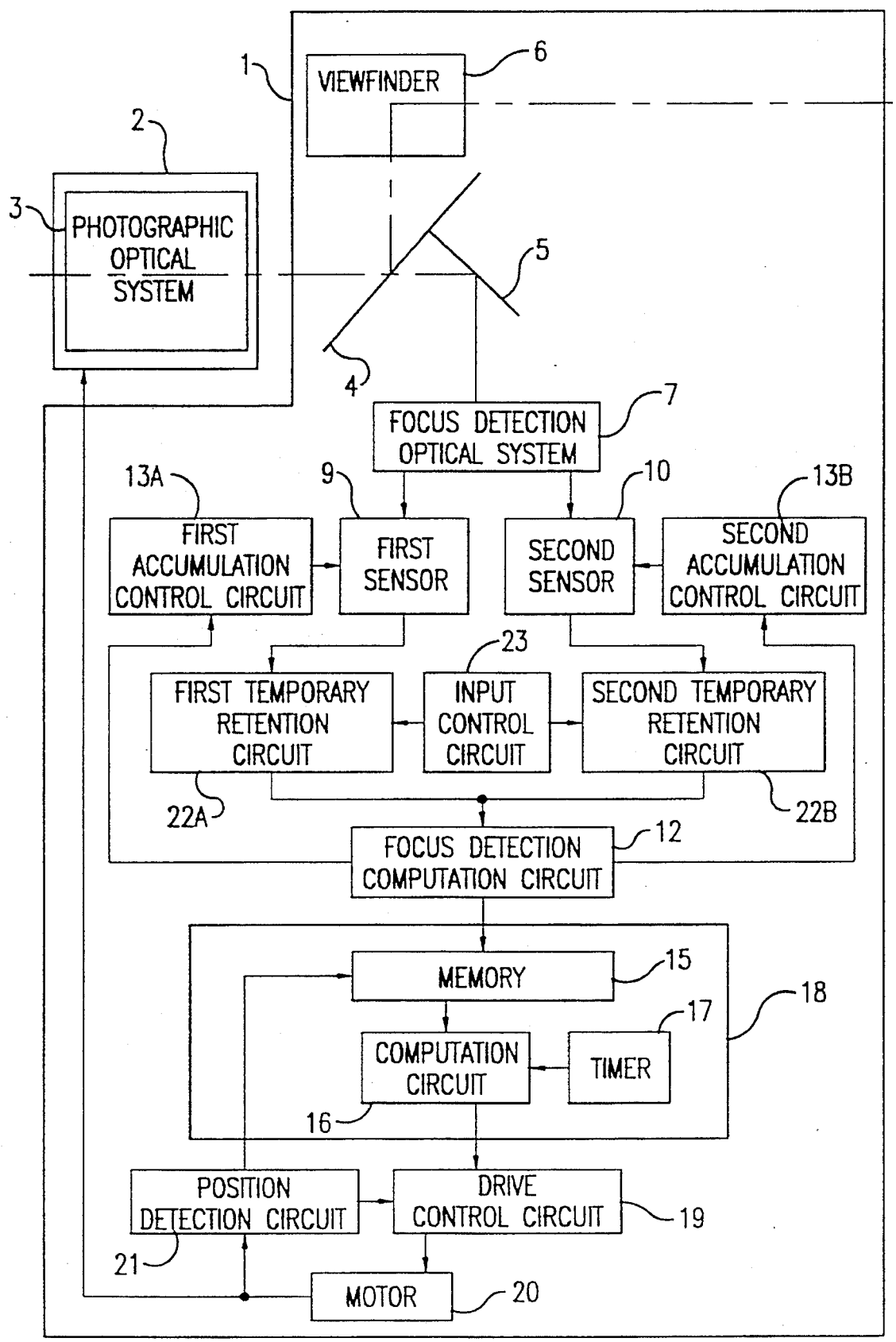
FIG. 12 is a block drawing showing the structure of the second embodiment.

FIG. 12 shows the structure of the second embodiment. In FIG. 12, elements identical to elements shown in FIG. 1 are marked with the identical symbols, and the following explanation focusses on the differing items.

In this second embodiment, a first temporary retention circuit 22A and a second temporary retention circuit 22B are provided in order to temporarily retain the electric charge accumulated by the first sensor 9 and the second sensor 10, respectively. The electric charge accumulated in the first sensor 9 is transmitted to the first temporary retention circuit 22A when accumulation has been completed. Similarly, the electric charge accumulated in the second sensor 10 is transmitted to the second temporary retention circuit 22B when accumulation has been completed. The output of the first temporary retention circuit 22A and the second temporary retention circuit 22B is combined into one unit, which is linked to the focus detection computation circuit 12. The subject image signals from the temporary retention circuits 22A and 22B are transferred to the focus detection computation circuit 12. The input control circuit 23 provides control so that transmission of the subject image signals from the first temporary retention circuit 22A and from the second temporary retention circuit 22B do not conflict with each other with respect to time of transmission.

Figure 13:
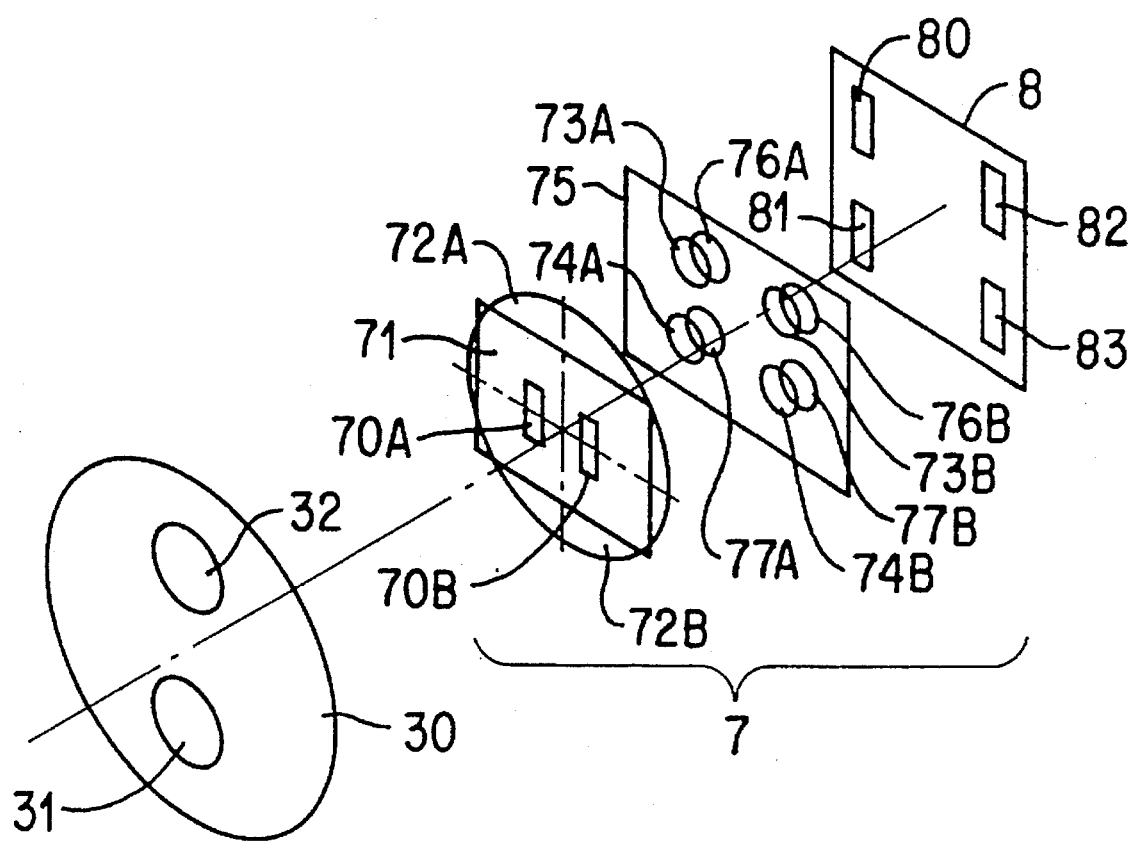
FIG. 13 is an angled view showing the structure of the focus detection optical system and the electric charge accumulation type sensors.

FIG. 13 shows the structure of the focus detection optical system 7 and the electric charge accumulation type sensor 8 used in the second embodiment.

The focus detection optical system 7 is equipped with a field of vision mask 71 having apertures 70A and 70B; condenser lenses 72A and 72B; a diaphragm mask 75 containing two pairs of diaphragm apertures 73A, 74A, 73B and 74B; and two pairs of re-imaging lenses 76A, 77A, 76B and 77B. In addition, the electric charge accumulation type sensor is equipped with two pairs of light receptors 80, 81, 82 and 83.

The primary image formed by the photographic optical system 3 on the aperture 70A along the optical axis is recreated as a pair of secondary images on the light receptors 80 and 81, and the primary image formed on the aperture 70B is recreated as a pair of secondary images on the light receptors 82 and 83.

With the structure described above, the two pairs of diaphragm apertures 73A, 74A, 73B and 74B are projected by the condenser lenses 72A and 72B onto a pair of regions 31 and 32 on the surface 30 of the exit pupil of the photographic optical system 3, and light that passes through these regions is formed first as a primary image in the vicinity of the field of vision mask 71. The primary image formed on the apertures 70A and 70B of the field of vision mask 71 passes through the condenser lenses 72A and 72B and the two pairs of diaphragm apertures 73A, 74A, 73B and 74B and is formed as 2 pairs of secondary images by the pair of re-imaging lenses 76A, 77A, 76B and 77B on the light receptors 80, 81 82 and 83 of electric charge accumulation type sensor 8.

Figure 14:
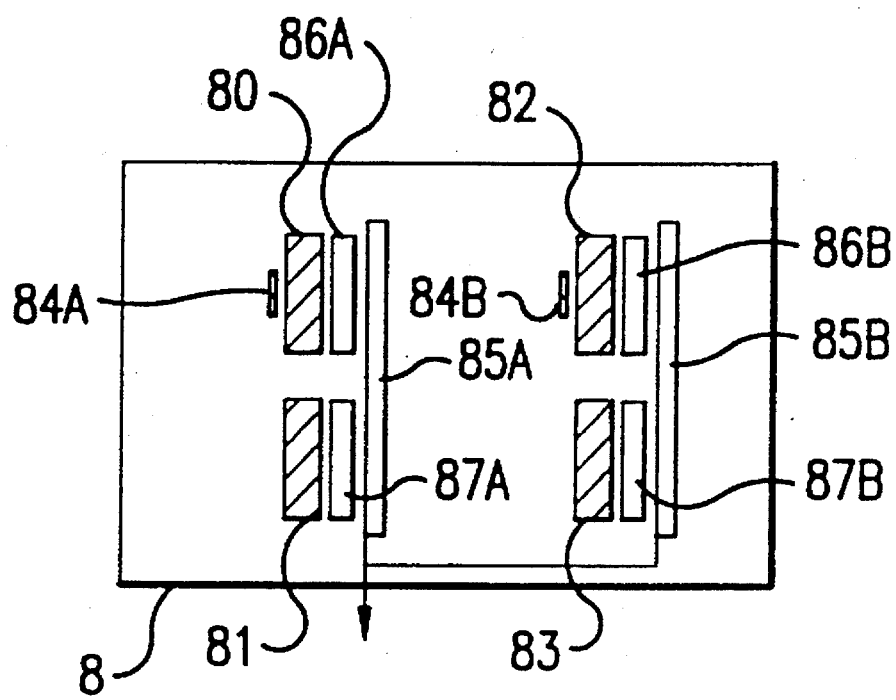
FIG. 14 is a drawing showing the detailed structure of the electric charge accumulation type sensors.

FIG. 14 shows the detailed structure of the electric charge accumulation type sensor 8, which is comprised of a single chip. Light receptors 80, 81, 82 and 83 are each composed of numerous pixels, and light quantity monitors 84A and 84B are mounted near light receptors 80 and 82 respectively. In addition, electric charge memories 86A, 87A, 86B and 87B are mounted parallel to the light receptors 80, 81, 82 and 83 in order to temporarily retain the electric charge accumulated in each light receptor, and shift registers 85A and 85B used in charge output transfer are mounted parallel to the electric charge memories 86A, 87A, 86B and 87B.

Light receptors 80 and 81 and light receptors 82 and 83 can be controlled so that the start and completion of charge accumulation is asynchronous and independent of one another, and each one starts accumulating charge upon receiving an electric charge accumulation start signal. Simultaneous with this, the light quantity monitors 84A and 84B generate monitor voltages in accordance with the illumination of the light receptors and the electric charge accumulation time. The monitor voltage output from the light quantity monitor 84A is compared with a preset standard voltage by the first accumulation control circuit 13A, and when the monitor voltage reaches the standard voltage, the first accumulation control circuit 13A generates an electric charge accumulation completion signal for light receptors 80 and 81. Similarly, the monitor voltage output from the light quantity monitor 84B is compared with a preset standard voltage by the second accumulation control circuit 13B, and when the monitor voltage reaches the standard voltage, the second accumulation control circuit 13B generates an electric charge accumulation completion signal for light receptors 82 and 83. Upon receiving the electric charge accumulation completion signal, the light receptors 80 and 81 transfer the electric charge they have accumulated to the electric charge memories 86A and 87A. In addition, upon receiving the electric charge accumulation completion signal, the light receptors 82 and 83 transfer the electric charge they have accumulated to the electric charge memories 86B and 87B.

Electric charge memories 86A and 87A transfer the accumulated charge in parallel to the shift register 85A following control commands from the input control circuit 23, following which the electric charge accumulated in each pixel is transferred serially to the outside as the sensor output following the timing of a transfer clock. Similarly, electric charge memories 86B and 87B transfer the accumulated charge in parallel to the shift register 85B following control commands from the input control circuit 23, following which the electric charge accumulated in each pixel is transferred serially to the outside as the sensor output following the timing of a transfer clock. The output of the shift registers 85A and 85B are combined together and are output out of the single chip electric charge accumulation type sensor 8.

It would also be acceptable have the first accumulation control circuit 13A and the second accumulation control circuit 13B formed on the single chip electric charge accumulation type sensor 8.

In this way, with the structure shown in FIGS. 13 and 14, the relationship of the relative positions of the pair of secondary images changes in accordance with the focus state of the photographic optical system 3. The light intensity distribution of the secondary images is photoelectrically converted by the light receptors 80, 81, 82 and 83 and becomes an electrical subject image signal.

Light receptors 80 and 81 of the electric charge accumulation type sensor 8, light quantity monitor 84A, electric charge memories 86A and 87A, and shift register 85A, which are shown in FIGS. 13 and 14, make up the first sensor 9 shown in FIG. 12, while light receptors 82 and 83 of the electric charge accumulation type sensor 8, light quantity monitor 84B, electric charge memories 86B and 87B, and shift register 85B make up the second sensor 10 shown in FIG. 12.

Referring again to FIG. 12, the pair of subject image signals from the first sensor 9 and the pair of subject image signals from the second sensor 10 are sent to the focus detection computation circuit 12. The focus detection computation circuit 12, by computing the relationship of the relative positions of these subject image signals, detects the defocus amount X of the intended focussing surface and the image surface in the first focus detection region of the photographic optical system 3 and the defocus amount Y of the intended focussing surface and the image surface in the second focus detection region.

Figure 15:
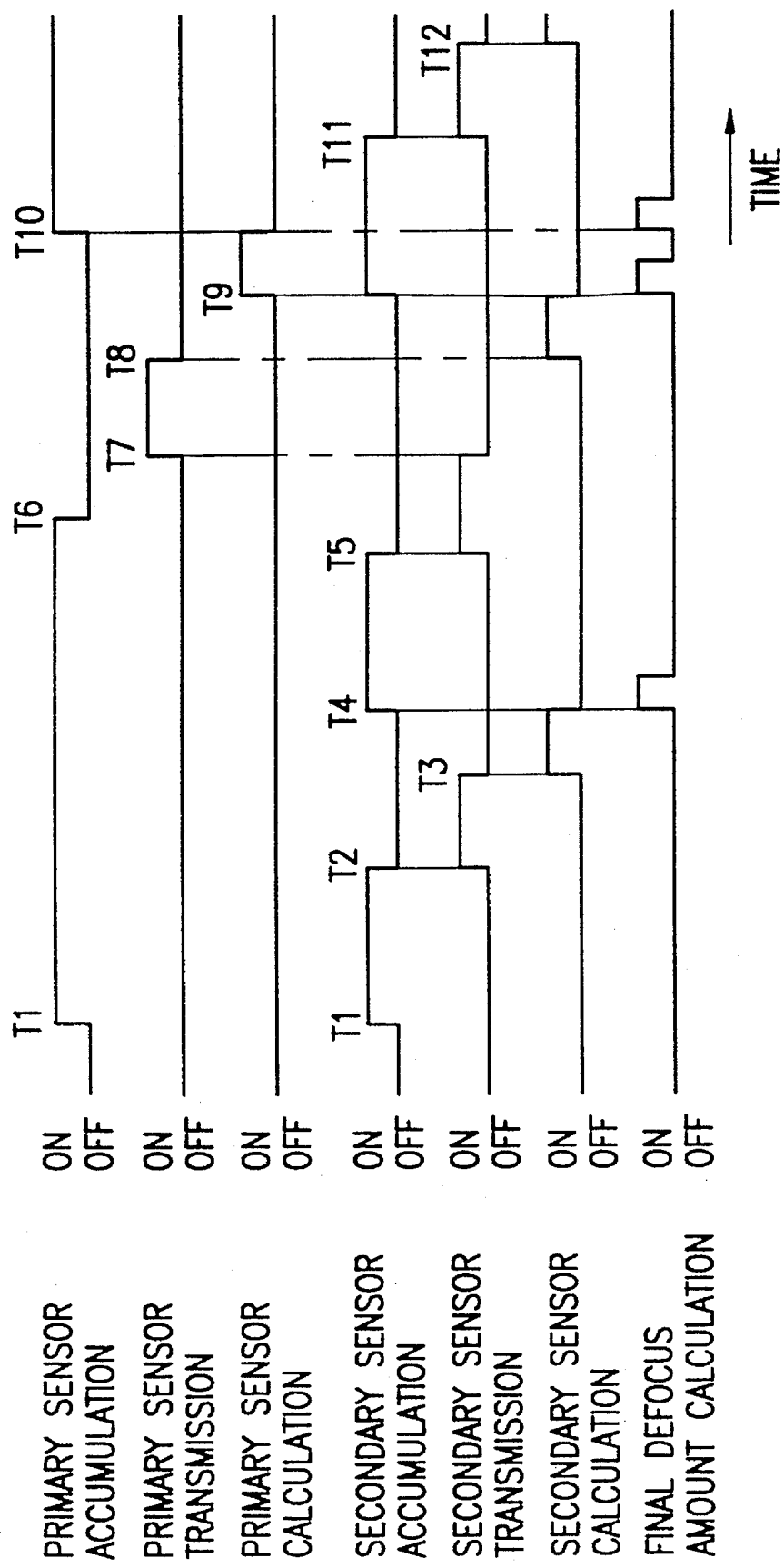
FIG. 15 is a time chart showing the operations of the first and second sensors in the second embodiment, and computation of the final defocus amount.

FIG. 15 is a time chart showing the electric charge accumulation operation and the output transfer operation of the first sensor 9 and the second sensor 10, and the operation of computing the defocus amounts X and Y from the output of the two sensors. In order to make the explanation easier to understand, FIG. 15 shows the case in which electric charge accumulation in both the first sensor 9 and the second sensor 10 starts simultaneously at time T1, but the first sensor 9 and the second sensor 10 are already in operation prior to this time T1, and electric charge accumulation, output transfer, focus detection computations and final defocus amount computations have already been performed.

Because the first sensor 9 captures dim subjects, it has a longer electric charge accumulation time than does the second sensor 10. The operations through time T6 are basically the same as those shown in FIG. 5. However, in FIG. 15, the transfer operation and the computation operation of the second sensor 10 are shown separately. Until time T6, the output transfer operations of the first sensor 9 and the second sensor 10 are not performed simultaneously.

At time T6, the electric charge accumulation in the first sensor 9 is completed, and when the accumulated charge is transferred to the first temporary retention circuit 22A, because the accumulated charge of the second sensor 10 is being transferred to the focus detection computation circuit 12 from the second temporary retention circuit 22B, transferring of the accumulated charge of the first sensor 9 from the first temporary retention circuit 22A to the focus detection computation circuit 12 is prevented by the input control circuit 23. At time T7, when the transfer of charge from the second temporary retention circuit 22B to the focus detection computation circuit 12 is complete, the input control circuit 23 allows charge to be transferred from the first temporary retention circuit 22A to the focus detection computation circuit 12, and from time T7 the accumulated charge of the first sensor 9 is transferred from the first temporary retention circuit 22A to the focus detection computation circuit 12.

At time T8, when the transfer of charge from the first temporary retention circuit 22A to the focus detection computation circuit 12 is complete, computation of the defocus amount Y by the focus detection computation circuit 12 is started based on the subject image signal from the second sensor 10. At time T9, when computation of the defocus amount Y has been completed, electric charge accumulation is started in the second sensor 10 and computation of the defocus amount X by the focus detection computation circuit 12 is started based on the subject image signal from the first sensor 9. Furthermore, at time T10, when computation of the defocus amount X has been completed, electric charge accumulation is started in the first sensor 9. Following this, the same operations are repeated.

When the transfer of charge from the first temporary retention circuit 22A to the focus detection computation circuit 12 and the transfer of charge from the second temporary retention circuit 22B to the focus detection computation circuit 12 are in conflict with respect to time of transmission, the input control circuit 23 gives priority to the charge transfer that was started first, and prevents the second charge transfer from occurring until the first charge transfer has been completed.

Computation of the defocus amount Z is performed at the time when either the defocus amount X or Y is generated (times T4, T9 and T10 in FIG. 15) in an operation similar to that shown in FIG. 5.

FIGS. 16 through 20 are flow charts that show the operations of the second embodiment when the first accumulation control circuit 13A, the second accumulation control circuit 13B, and the input control circuit 23 are comprised of two auxiliary microcomputers, the focus detection computation circuit 12 is comprised of a separate auxiliary microcomputer, and the defocus amount setting part 18 is comprised of the main microcomputer.

Figure 16:
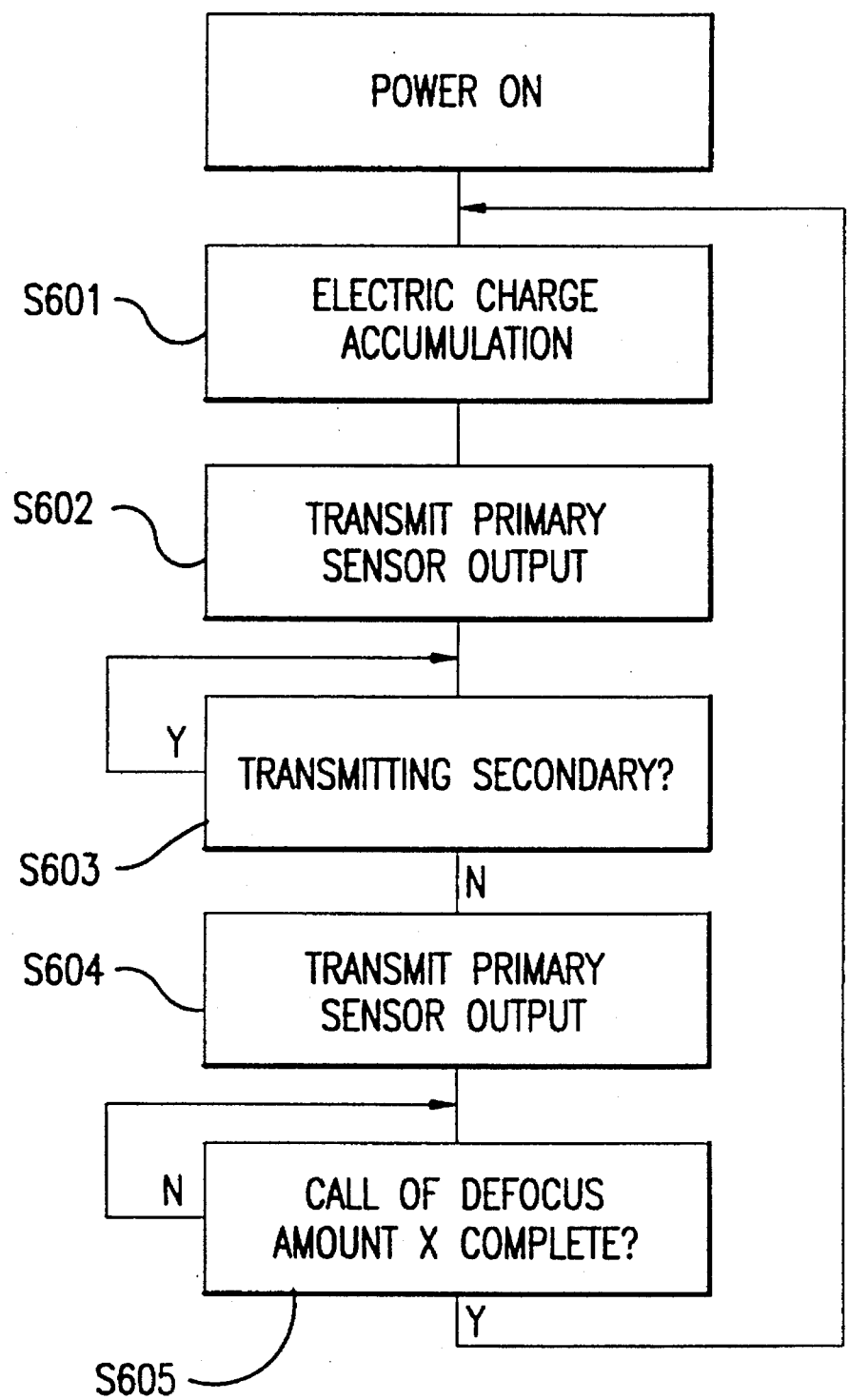
FIG. 16 is a flow chart showing the operations of the microcomputer that comprises the first accumulation control circuit and the input control circuit.

FIG. 16 is a flow chart that shows the operations of the auxiliary microcomputer that comprises the first accumulation control circuit 13A and the input control circuit 23.

The microcomputer starts the operations shown in FIG. 16 when a power source is activated in the camera. In step S601, charge accumulation is performed in the first sensor 9, following which in step S602, the focus detection signal from the first sensor 9 is transmitted to the first temporary retention circuit 22A.

In step S603, the determination is made as to whether or not the focus detection signal of the second sensor 10 is being transferred from the second temporary retention circuit 22B to the focus detection computation circuit 12, and if this transfer is in progress, the microcomputer pauses until it has been completed. When the transfer of the focus detection signal of the second sensor 10 has been completed, the microcomputer advances to step S604 and transfers the focus detection signal of the first sensor 9 from the first temporary retention circuit 22A to the focus detection computation circuit 12. In step S605, the determination is made as to whether or not computation of the defocus amount X has been completed, and if the computation has been completed the microcomputer returns to step S601 and repeats the operations described above.

Figure 17:
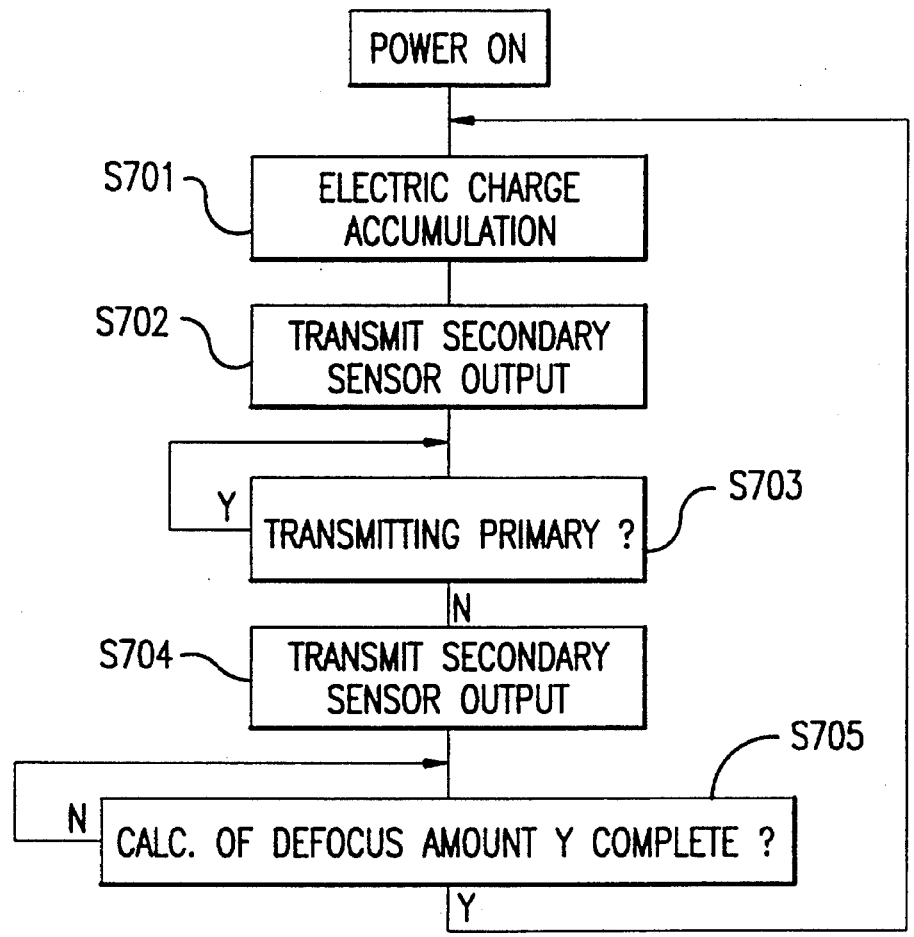
FIG. 17 is a flow chart showing the operations of the microcomputer that comprises the second accumulation control circuit and the input control circuit.

FIG. 17 is a flow chart that shows the operations of the auxiliary microcomputer that comprises the second accumulation control circuit 13B and the input control circuit 23.

The microcomputer starts the operations shown in FIG. 17 when a power source is activated in the camera. In step S701, charge accumulation is performed in the second sensor 10, following which in step S702, the focus detection signal from the second sensor 10 is transferred to the second temporary retention circuit 22B. In step S703, the determination is made as to whether or not the focus detection signal of the first sensor 9 is being transferred from the first temporary retention circuit 22A to the focus detection computation circuit 12, and if this transfer is in progress, the microcomputer pauses until it has been completed. When the transfer of the focus detection signal of the first sensor 9 has been completed, the microcomputer advances to step S704 and transfers the focus detection signal of the second sensor 10 from the second temporary retention circuit 22B to the focus detection computation circuit 12. In step S705, the determination is made as to whether or not computation of the defocus amount Y has been completed, and if the computation has been completed, the microcomputer returns to step S701 and repeats the operations described above.

Figure 18:
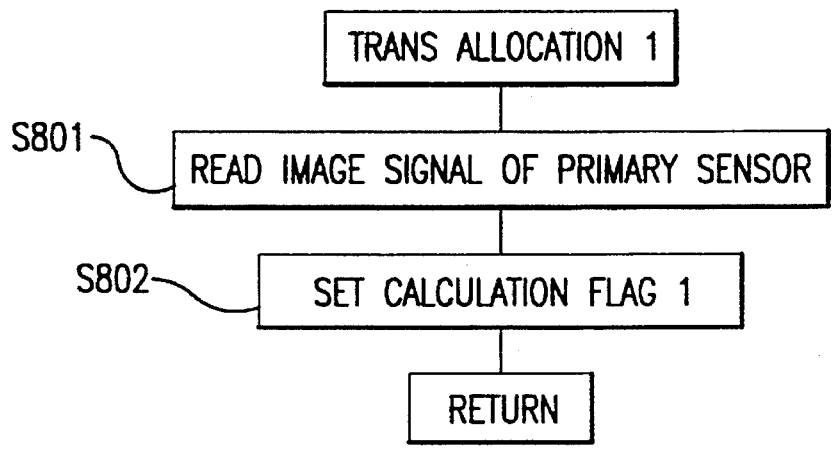
FIG. 18 is a flow chart showing the transfer interruption operation of the microcomputer that comprises the focus detection computation circuit.
Figure 19:
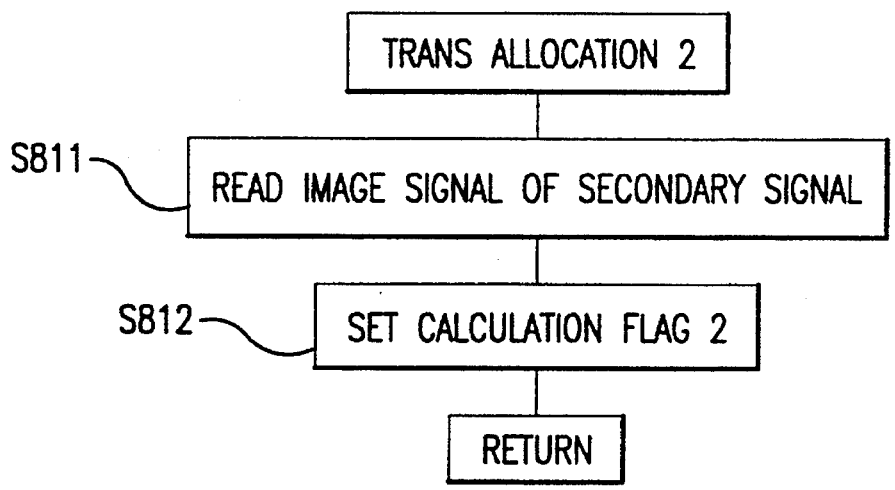
FIG. 19 is a flow chart showing another transfer interruption operation of the microcomputer that comprises the focus detection computation circuit.

FIGS. 18 and 19 are flow charts that show the interruption operations of the focus detection computation circuit 12.

The auxiliary microcomputer of the focus detection computation circuit 12 starts the interruption operation shown in FIG. 18 when an interruption signal is input from the auxiliary microcomputer that comprises the first accumulation control circuit 13A and the input control circuit 23. In step S801, the subject image signal of the first sensor 9 is read from the first temporary retention circuit 22A, following which in step S802, computation flag 1 is set and the interruption process is completed.

In addition, the auxiliary microcomputer of the focus detection computation circuit 12 starts the interruption operation shown in FIG. 19 when an interruption signal is input from the auxiliary microcomputer that comprises the second accumulation control circuit 13B and the input control circuit 23. In step S811, the subject image signal of the second sensor 10 is read from the second temporary retention circuit 22B, following which in step S812, computation flag 2 is set and the interruption process is completed.

Figure 20:
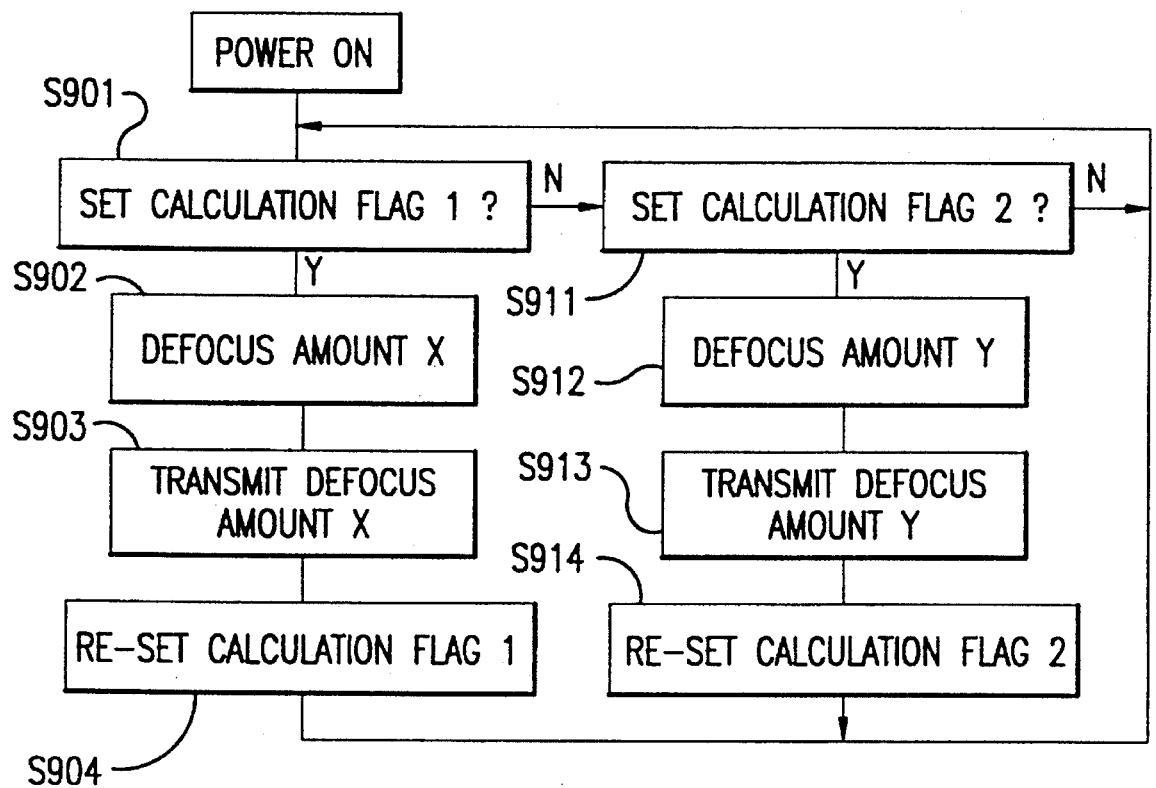
FIG. 20 is a flow chart showing the computation process of the microcomputer that comprises the focus detection computation circuit.

FIG. 20 is a flow chart that shows the computation process of the focus detection computation circuit 12.

The microcomputer of the focus detection computation circuit 12 starts the operations shown in FIG. 20 when a power source is activated in the camera. In step S901, the determination is made as to whether or not computation flag 1 has been set. If it has been set the microcomputer advances to step S902, and if it has not been set, the microcomputer moves to step S911. In step S902, the defocus amount X is computed based on the focus detection signal of the first sensor 9 read from the first temporary retention circuit 22A. In step S903, the defocus amount X is transmitted to the defocus amount setting part 18, following which the computation flag 1 is reset in step S904, and the microcomputer then returns to step S901.

On the other hand, in step S911 the determination is made as to whether or not computation flag 2 has been set. If it has been set, the microcomputer advances to step S912, and if it has not been set, the microcomputer returns to step S901. In step S912, the defocus amount Y is computed based on the focus detection signal of the second sensor 10 read from the second temporary retention circuit 22B. In step S913, the defocus amount Y is transmitted to the defocus amount setting part 18, following which the computation flag 2 is reset in step S914 and the microcomputer then returns to step S901.

With the second embodiment as described above, the first accumulation control circuit 13A, the second accumulation control circuit 13B, and the input control circuit 23 are comprised of two auxiliary microcomputers, the focus detection computation circuit 12 is comprised of a separate auxiliary microcomputer, and the defocus amount setting part 18 is comprised of the main microcomputer, but it would also be viable for the operations shown in FIGS. 16 and 17 to be processed by interruption by the microcomputer of the focus detection computation circuit 12. Even in this case, the input terminals of the focus detection computation circuit 12 from the first sensor 9 and the second sensor 10 are a single unit, and computation of the defocus amounts are all performed by the microcomputer of the focus detection computation circuit 12, and because of this, there is no decrease in focus detection computation speed.

In addition, it would also be viable for the operations shown in FIGS. 16 through 20 to be processed by the main microcomputer of the defocus amount setting part 18.

In each of the embodiments described above, examples were given using two sensors, but the present invention can also be applied to cases where three or more sensors are used.

In the structure of the embodiments explained above, the photographic optical system 3 comprises the photographic optical system, the focus detection units 14A and 14b comprise the focus detection means, the defocus amount setting part 18 comprises the setting means, the drive control circuit 19 and the motor 20 comprise the drive means, the focus detection optical system 7 comprises the focus detection optical system, the first sensor 9 and the second sensor 10 comprise the sensors, the first focus detection computation circuit 12A and the second focus detection computation circuit 12B comprise the computation circuit, the first accumulation control circuit 13A and the second accumulation control circuit 13B comprise the accumulation control means, the memory 15 comprises the memory means, the focus detection computation circuit 12 comprises the computation means, the first temporary retention circuit 22A and the second temporary retention circuit 22B comprise the temporary retention means, and the input control circuit 23 comprises the input control means.

With the present invention as explained above, in numerous focus detection regions established on the photographic screen of the photographic optical system, defocus amounts of the photographic optical system are detected asynchronously and independently of one another in each of the focus detection regions, and when the defocus amounts are detected in the various focus detection regions or at preset time intervals, the value of the defocus amounts in each of the focus detection regions at that time is compensated and the final defocus amount is set from among these numerous compensated defocus amounts in order to drive the photographic optical system. Because of this, even when there are regions that require a long period of time in order to compensate the defocus amount for a subject on the photographic screen having a large variance in brightness, the final defocus amount can be set in a short time, thereby realizing improved responsiveness in the focus adjustment.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An automatic focus adjustment camera having a photographic optical system including a photographic screen and movable along an optical axis to form an image of a subject on an intended focus surface, the automatic focus adjustment camera comprising:

a plurality of focus detection means each for responding to a plurality of focus detection regions established on said photographic screen and for detecting a preliminary defocus amount of said photographic optical system in each said focus detection region, each of said plurality of focus detection means operating asynchronously and independently of one another;

setting means for setting a final defocus amount from the preliminary defocus amounts detected by said plurality of focus detection means; and drive means for driving said photographic optical system in accordance with the final defocus amount set by said setting means.

2. An automatic focus adjustment camera according to claim 1, wherein each of said plurality of focus detection means comprises:

a focus detection optical system that forms an image of the subject with light from each said focus detection region, sensors that receive light from the image of the subject formed by said focus detection optical system, and computation circuits that compute the preliminary defocus amount of the photographic optical system in each said focus detection region based on output of said sensors.

3. An automatic focus adjustment camera according to claim 2, wherein said sensors are electric charge accumulation type sensors, and each focus detection means comprises accumulation control means for controlling an electric charge accumulation start time and an accumulation interval of the electric charge accumulation type sensors, said control means controlling said electric charge accumulation start time and said accumulation interval asynchronously and independently of an electric charge accumulation start time and an accumulation interval of other electric charge accumulation type sensors.

4. An automatic focus adjustment camera according to claim 1, wherein the setting means comprises memory means for memorizing the defocus amounts detected by the plurality of focus detection means, and when the plurality of focus detection means detect the defocus amounts, the camera compensates each defocus amount stored in the memory means in accordance with the amount of movement of the photographic optical system to that point, said setting means setting the final defocus amount in accordance with the detected defocus amounts and the compensated defocus amounts.

5. An automatic focus adjustment camera according to claim 2, wherein the setting means comprises memory means for memorizing the defocus amounts detected by the plurality of focus detection means, and when the plurality of focus detection means detect the defocus amounts, the camera compensates each defocus amount stored in the memory means in accordance with the amount of movement of the photographic optical system to that point, said setting means setting the final defocus amount in accordance with the detected defocus amounts and the compensated defocus amounts.

6. An automatic focus adjustment camera according to claim 1, wherein the setting means comprises memory means for memorizing the defocus amounts detected by the plurality of focus detection means, and at preset times compensates each defocus amount stored in the memory means in accordance with the amount of movement of the photographic optical system to that point, said setting means setting the final defocus amount in accordance with the compensated defocus amounts.

7. An automatic focus adjustment camera according to claim 2, wherein the setting means comprises memory means for memorizing the defocus amounts detected by the plurality of focus detection means, and at preset times compensates each defocus amount stored in the memory means in accordance with the amount of movement of the photographic optical system to that point, said setting means setting the final defocus amount in accordance with the compensated defocus amounts.

8. An automatic focus adjustment camera having a photographic optical system including a photographic screen and movable along an optical axis to form an image of a subject on an intended focus surface, the automatic focus adjustment camera comprising:

multiple focus detection optical systems responsive to multiple focus detection regions established on the photographic screen to form an image of the subject with light from each focus detection region;

multiple electric charge accumulation type sensors configured to receive light from the images of the subject formed by said multiple focus detection optical systems;

accumulation control means for controlling electric charge accumulation start times and accumulation intervals of said electric charge accumulation type sensors;

computation means for computing a preliminary defocus amount of the photographic optical system in each of said focus detection regions based on the output of said multiple electric charge accumulation type sensors;

setting means for setting a final defocus amount from among the preliminary defocus amounts computed by said computation means;

drive means for driving said photographic optical system in accordance with the final defocus amount set by said setting means; and accumulation control means for controlling the multiple electric charge accumulation sensors asynchronously and independently from one another.

9. An automatic focus adjustment camera according to claim 8, further comprising temporary retention means for temporarily retaining output of the multiple electric charge accumulation type sensors, and input control means for controlling said temporary retention means so that the output of the multiple electric charge accumulation type sensors is not simultaneously input into said computation means.

10. An automatic focus adjustment camera according to claim 8, wherein said setting means comprises memory means for memorizing the preliminary defocus amounts in each focus detection region computed by the computation means, wherein when the computation means computes the preliminary defocus amounts, the camera compensates each defocus amount stored in the memory means in accordance with an amount of movement of the photographic optical system to that point, said setting means setting the final defocus amount in accordance with the defocus amounts detected at that time and the compensated defocus amounts.

11. An automatic focus adjustment camera according to claim 8, wherein the setting means comprises memory means for memorizing the preliminary defocus amounts in each focus detection region computed by the computation means, and at preset times compensates each defocus amount stored in the memory means in accordance with the amount of movement of the photographic optical system to that point, said setting means setting the final defocus amount from among the compensated defocus amounts.

12. An automatic focus adjustment camera having a photographic optical system movable along an optical axis to form an image of a subject on an intended focus surface, the automatic focus adjustment camera comprising:

a focus detection optical system defining a plurality of regions on an exit pupil of said photographic optical system and defining two focus detection regions established on said intended focus surface and comprising a lens arrangement converting two primary images on said two focus detection regions to two pairs of secondary images;

a focus detection unit that determines a first primary defocus amount in accordance with one of said pairs of secondary images and determines a second primary defocus amount in accordance with the other of said pairs of secondary images, wherein said first and second focus primary defocus amounts are determined asynchronously and independently of each other; and a final defocus amount setting unit operatively coupled to said focus detection unit and setting a final defocus amount in accordance with said first and second primary defocus amounts.

13. An automatic focus adjustment camera according to claim 12, wherein said focus detection unit comprises a first focus detection unit that determines said first primary defocus amount and a second focus detection unit that determines said second primary defocus amount, said first and second focus detection units operating asynchronously and independently of each other.

14. An automatic focus adjustment camera according to claim 13, wherein said focus detection optical system comprises:

a field of vision mask including a pair of apertures, said photographic optical system forming said primary image in the vicinity of said field of vision mask on said apertures;

a condenser lens downstream along said optical axis of said field of vision mask;

a diaphragm mask including a pair of diaphragm apertures, said diaphragm mask disposed downstream along said optical axis of said condenser lens; and a pair of re-imaging lenses, two primary images on said pair of apertures of said field of vision mask passing through said condenser lens and said pair of diaphragm apertures to said re-imaging lenses, said re-imaging lenses forming said two pairs of secondary images from said two primary images.

15. An automatic focus adjustment camera according to claim 14, wherein said first focus detection unit and said second focus detection unit each comprise a plurality of sensors that sense light received from said re-imaging lenses.

16. An automatic focus adjustment camera according to claim 15, wherein said sensors comprise electric charge accumulation type sensors.

17. An automatic focus adjustment camera according to claim 16, wherein said electric charge accumulation type sensors each comprise:

a pair of light receptors that convert light received from said re-imaging lenses to charge output, thereby defining a subject image signal;

a light quantity monitor; and a shift register, said shift register transferring said charge output to said final defocus amount setting unit.

18. An automatic focus adjustment camera according to claim 17, wherein said first focus detection unit and said second focus detection unit further comprise a first focus detection computation circuit and a second focus detection computation circuit, respectively that detect said first defocus amount and said second defocus amount in accordance with a relationship between relative positions of said subject image signals.

19. An automatic focus adjustment camera according to claim 16, wherein said first focus detection unit and said second focus detection unit further comprise a first accumulation control circuit and a second accumulation control circuit, respectively, that control electric charge accumulation in said plurality of sensors, said first accumulation control circuit and said second accumulation control circuit operating asynchronously and independently of one another and output said first primary defocus amount and said second primary defocus amount to said final defocus amount setting unit.

20. An automatic focus adjustment camera according to claim 12, wherein said final defocus amount setting unit comprises:

a memory that stores a lens position; and a computation circuit that sets said final defocus amount in accordance with predetermined parameters.

21. An automatic focus adjustment camera according to claim 20, wherein said predetermined parameters comprise the stored lens position and said first and second primary defocus amounts stored in said memory and a currently detected lens position and currently detected first and second primary defocus amounts.

22. An automatic focus adjustment camera according to claim 20, wherein said final defocus amount setting unit further comprises a timer, said predetermined parameters comprising the stored lens position and said first and second primary defocus amounts stored in said memory when said timer sends and interruption signal at a fixed time interval.

23. An automatic focus adjustment camera according to claim 12, further comprising:

a drive control circuit that receives said final defocus amount and converts said final defocus amount into a lens driving amount;

a motor driving said lens: and a position detection circuit operatively connected to said drive control circuit and converting said lens driving amount into a rotation amount of said motor, said motor operatively coupled to said photographic optical system.

24. An automatic focus adjustment camera according to claim 12, wherein said focus detection optical system comprises:

a field of vision mask including a pair of apertures, said photographic optical system forming said primary image in the vicinity of said field of vision mask on said apertures;

a condenser lens downstream along said optical axis of said field of vision mask;

a diaphragm mask including a pair of diaphragm apertures, said diaphragm mask disposed downstream along said optical axis of said condenser lens; and a pair of re-imaging lenses, two primary images on said pair of apertures of said field of vision mask passing through said condenser lens and said pair of diaphragm apertures to said re-imaging lenses, said re-imaging lenses forming said two pairs of secondary images from said two primary images.

25. An automatic focus adjustment camera according to claim 24, wherein said focus detection unit comprises a plurality of sensors that sense light received from said re-imaging lenses.

26. An automatic focus adjustment camera according to claim 25, wherein said sensors comprise electric charge accumulation type sensors.

27. An automatic focus adjustment camera according to claim 26, wherein said electric charge accumulation type sensors each comprise:

a pair of light receptors that convert light received from said re-imaging lenses to charge output, thereby defining a subject image signal;

a light quantity monitor; and a shift register, said shift register transferring said charge output to said final defocus amount setting unit.

28. An automatic focus adjustment camera according to claim 27, wherein said electric charge accumulation type sensors each further comprise a pair of electric charge memories that temporarily retain electric charge accumulated in said light receptors.

29. An automatic focus adjustment camera according to claim 28, further comprising an input control circuit coupled to said electric charge memories, said input control circuit controlling output from said electric charge memories to a focus detection computation circuit, said focus detection computation circuit detecting said first primary defocus amount and said second primary defocus amount in accordance with a relationship between relative positions of said subject image signals.

30. A method for automatic focus adjustment of a camera having a photographic optical system movable along an optical axis to form an image of a subject on an intended focus surface, the method comprising the steps of:

converting two primary images of said photographic optical system on two focus detection regions established on said intended focus surface to two pairs of secondary images;

determining a first primary defocus amount in accordance with one of said pairs of secondary images;

determining a second primary defocus amount in accordance with the other of said pairs of secondary images, wherein said first and second focus primary defocus amounts are determined asynchronously and independently of each other; and setting a final defocus amount in accordance with said first and second primary defocus amounts.

31. A method for automatic focus adjustment of a camera having a photographic optical system movable along an optical axis to form an image of a subject on an intended focus surface, the method comprising the steps of:

accumulating electric charge in a first sensor;

accumulating electric charge in a second sensor;

transmitting first subject image data to a first focus detection computation circuit;

transmitting second subject image data to a second focus detection computation circuit;

determining a first primary defocus amount in accordance with said first subject image data; and determining a second primary defocus amount in accordance with said second subject image data, said determining of said first primary defocus amount and said determining of said second primary defocus amount steps are performed asynchronously and independently of each other.

32. An automatic focus adjustment method according to claim 31, wherein if said first primary defocus amount has been received by said final defocus amount setting device, the method further comprising the steps of:

storing an X lens position at a time when said first primary defocus amount was received and storing said first primary defocus amount;

determining a compensated defocus amount based on said second primary defocus amount and a Y lens position at a time when said second primary defocus amount was received; and setting said final defocus amount in accordance with said first primary defocus amount and said compensated defocus amount.

33. An automatic focus adjustment method according to claim 32, wherein said compensated defocus amount X'n-1 is determined in accordance with the following relation:

$$X'n\text{-}1=(Xn\text{-}1)+K\times\{(Ln\text{-}1)\text{-}Lm\}$$

where Xn-1 is said first primary defocus amount, K is a conversion constant, Ln-1 is said stored lens position and Lm is a currently detected lens position.

34. An automatic focus adjustment method according to claim 33, wherein said final defocus amount Zk is set in accordance with the following relation:

$$Zk=\{(X'n\text{-}1)+Ym56\,/2$$

where Ym is said second primary defocus amount.

35. An automatic focus adjustment method according to claim 34, wherein said final defocus amount is the greater of said compensated defocus amount and said second primary defocus amount.

36. An automatic focus adjustment method according to claim 31, wherein if said first primary defocus amount has not been received by said final defocus amount setting device and said second primary defocus amount has been received by said final defocus amount setting device, the method further comprising the steps of:

storing a Y lens position at a time when said second primary defocus amount was received and storing said second primary defocus amount;

determining a compensated defocus amount based on a previous first primary defocus amount and an X lens position at a time when said previous first primary defocus amount was generated; and setting said final defocus amount in accordance with said second primary defocus amount and said compensated defocus amount.

37. An automatic focus adjustment method according to claim, 36, wherein said compensated defocus amount Y'm is determined in accordance with the following relation:

$$Y'm=Ym+K\times(Lm\text{-}Ln)$$

where Ym is said second primary defocus amount, K is a conversion constant, Lm is said Y lens position and Ln is a currently detected lens position.

38. An automatic focus adjustment method according to claim 37, wherein said final defocus amount Zk+1 is set in accordance with the following relation:

$$Zk+1=(Xn+Y'm)/2$$

where Xn is said previous first primary defocus amount.

39. An automatic focus adjustment method according to claim 38, wherein said final defocus amount is the greater of said compensated defocus amount and said previous first primary defocus amount.

40. An automatic focus adjustment method according to claim 31, further comprising the steps of:

storing said first primary defocus amount and an X lens position at a time when said first primary defocus amount was generated if said first primary defocus amount has been received;

storing said second primary defocus amount and a Y lens position at a time when said second primary defocus amount was generated if said second primary defocus amount has been received;

initiating a timer interruption operation at a fixed time interval;

determining a first compensated defocus amount in accordance with said first primary defocus amount stored in said storing step, said X lens position, and a current lens position;

determining a second compensated defocus amount in accordance with said second primary defocus amount stored in said storing step, said Y lens position, and a current lens position; and setting said final defocus amount in accordance with said first and second compensated defocus amounts.

41. An automatic focus adjustment method according to claim 31, wherein said first compensated defocus amount X'n is determined in accordance with the following relation:

$$X'n=Xn+K\times(Ln\text{-}Lt)$$

where Xn is said first primary defocus amount, K is a conversion constant, Ln is said X lens position, and Lt is said current lens position.

42. An automatic focus adjustment method according to claim 41, wherein said second compensated defocus amount Y'n is determined in accordance with the following relation:

$$Y'm=Ym+K\times(Lm\text{-}Lt)$$

where Ym is said second primary defocus amount, K is a conversion constant, Lm is said Y lens position, and Lt is said current lens position.

43. An automatic focus adjustment method according to claim 42, wherein said final defocus amount Zt is set in accordance with the following relation:

$$Zt=(X'n+Y'm)/2.$$

44. An automatic focus adjustment method according to claim 42, wherein said final defocus amount is the greater of said first compensated defocus amount and said second compensated defocus amount.

45. An automatic focus adjustment method according to claim 40, further comprising the step of determining a rate of change in said first and second defocus amounts, wherein said final defocus amount is set further in accordance with said rate of change in said first and second defocus amounts.

46. A method for automatic focus adjustment of a camera having a photographic optical system movable along an optical axis to form an image of a subject on an intended focus surface, the method comprising the steps of:

accumulating electric charge in a first sensor;

transmitting first subject image data to a first focus detection computation circuit;

determining a first primary defocus amount in accordance with said first subject image data;

outputting said first primary defocus amount to a first temporary retention circuit;

accumulating electric charge in a second sensor;

transmitting second subject image data to a second focus detection computation circuit;

determining a second primary defocus amount in accordance with said second subject image data, wherein said determining of said first primary defocus amount and said determining of said second primary defocus amount steps are performed asynchronously and independently of each other;

outputting said second primary defocus amount to a second temporary retention circuit;

determining whether one of said first primary defocus amount and said second primary defocus amount is being transferred to a focus detection computation circuit; and preventing the other of said first primary defocus amount and said second primary defocus amount from being transferred if said one of said first primary defocus amount and said second primary defocus amount is being transferred to said focus detection computation circuit.

* * * * *